(12) United States Patent
Zhao et al.

(10) Patent No.: US 8,699,323 B2
(45) Date of Patent: Apr. 15, 2014

(54) OPTIMIZED DATA RETRY MECHANISMS FOR EVOLVED HIGH RATE PACKET DATA (EHRPD)

(75) Inventors: Suli Zhao, San Diego, CA (US); Srinivasan Balasubramanian, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 12/971,446

(22) Filed: Dec. 17, 2010

(65) Prior Publication Data
US 2011/0149725 A1 Jun. 23, 2011

Related U.S. Application Data

(60) Provisional application No. 61/288,653, filed on Dec. 21, 2009.

(51) Int. Cl.
- H04L 1/00 (2006.01)
- H04W 72/00 (2009.01)
- G06F 11/00 (2006.01)

(52) U.S. Cl.
USPC ........ 370/216; 370/235; 370/255; 455/452.1; 714/47.1

(58) Field of Classification Search
None
See application file for complete search history.

(56) References Cited

U.S. PATENT DOCUMENTS

| | | | |
|---|---|---|---|
| 7,720,482 B2 * | 5/2010 | Chaudry et al. | 455/442 |
| 7,826,440 B1 * | 11/2010 | Suder et al. | 370/352 |
| 2007/0036079 A1 * | 2/2007 | Chowdury et al. | 370/235 |
| 2007/0232294 A1 * | 10/2007 | Welnick | 455/426.1 |
| 2007/0281684 A1 * | 12/2007 | Parmar et al. | 455/432.1 |
| 2013/0190023 A1 * | 7/2013 | Bhatt et al. | 455/466 |

FOREIGN PATENT DOCUMENTS

| | | | |
|---|---|---|---|
| JP | 11252663 A | | 9/1999 |
| JP | 2009005351 A | | 1/2009 |
| JP | 2011523534 A | | 8/2011 |
| WO | WO 2006089198 A1 | * | 8/2006 |
| WO | WO2006089198 A1 | | 8/2006 |
| WO | 2006098198 A1 | | 9/2006 |
| WO | WO2008036442 A2 | | 3/2008 |
| WO | 2009150155 A1 | | 12/2009 |

OTHER PUBLICATIONS

J. Arkko, H. Haverinen, Network Working Group Request for Comments 4187, Extensible Authentication Protocol Method for 3rd Generation Authentication and Key Agreement (EAP-AKA) (Jan. 2006).*

3rd Generation Partnership Project 2, E-UTRAN—eHRPD Connectivity and Interworking: Core Network Aspects, 3GPP2 X.S0057-0 (Apr. 2009).*

(Continued)

*Primary Examiner* — Ian N Moore
*Assistant Examiner* — Eric P Smith
(74) *Attorney, Agent, or Firm* — Kenyon S. Jenckes

(57) ABSTRACT

A method for optimizing data retry mechanisms is described. The method includes attempting to originate a data call on an evolved high rate packet data system. The method also includes determining that originating the data call has failed. A type of failure that caused the data call to fail is determined. The frequency of data call origination attempts is reduced based on the type of failure.

42 Claims, 11 Drawing Sheets

(56) References Cited

OTHER PUBLICATIONS

"3rd Generation Partnership Project; Technical Specification Group Services and System Aspects; 3GPP System Architecture Evolution (SAE); Security aspects o f non-3GPP accesses;(Release 8)", 3GPP Draft; 33402-840-REVMARKS, 3rd Generation Partnership Project (3GPP), Mobile Competence Centre; 650, Route Des Lucioles ; F-06921 Sophia-Antipolis Cedex; France, Jun. 9, 2009, XP050347370.

Ekstrom H: "QoS control in the 3GPPevolved packet system", IEEE Communications Magazine, IEEE Service Center, Piscataway, US LNKD, DOI : 10 . 1109/MCOM.2009.4785383, vol. 47, No. 2, Feb. 1, 2009, pp. 76-83, XP011280742, ISSN: 0163-6804 pp. 76-78 , pp. 80-81 , figures 2,3,5,6.

International Search Report and Written Opinion—PCT/US2010/061365—ISA/EPO—Apr. 29, 2011.

Taiwan Search Report—TW099145010—TIPO—May, 14, 2013.

* cited by examiner

OPTIMIZED DATA RETRY MECHANISMS FOR EVOLVED HIGH RATE PACKET DATA (EHRPD)

RELATED APPLICATIONS

This application is related to and claims priority from U.S. Provisional Patent Application Ser. No. 61/288,653 filed Dec. 21, 2009, for "OPTIMIZED DATA RETRY MECHANISMS FOR EVOLVED HRPD (eHRPD)", which is incorporated herein by reference in its entirety.

TECHNICAL FIELD

The present disclosure relates generally to electronic devices for communication systems. More specifically, the present disclosure relates to systems and methods for optimized data retry mechanisms for evolved high rate packet data (eHRPD).

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wireless with each other and with a network. As the number of electronic devices increases, the bandwidth available for these electronic devices decreases. Furthermore, an electronic device may autonomously attempt to make connections to the network. If a failure is encountered, the electronic device may continue attempting to connect to the network, further reducing the bandwidth available to other electronic devices.

One example of an electronic device is a wireless communication device. A wireless communication device may be capable of accessing multiple core networks via multiple network access systems. In some cases, the wireless communication device may first attempt to access a preferred core network via a preferred network access system before attempting to access a less preferred core network via a less preferred network access system. Benefits may be realized by providing improved systems and methods for accessing network services.

SUMMARY

A method for optimizing data retry mechanisms is disclosed. The method includes attempting to originate a data call on an evolved high rate packet data system. The method also includes determining that originating the data call has failed. A type of failure that caused the data call to fail is determined. The frequency of data call origination attempts is reduced based on the type of failure.

The method may be performed by a wireless communication device. In one configuration, the method may be performed by an advanced mobile subscriber software on the wireless communication device. A request for the data call may be received from an application on the wireless communication device.

The type of failure may be a radio layer system failure. The evolved high rate packet data system may be avoided for a radio layer system failure time period. Silent redial may be performed for a silent redial period. It may be determined that the silent redial period has not ended. The data call may be attempted on another available system that is not throttled using silent redial procedures.

The type of failure may be a point-to-point protocol failure. The application may be notified of the failure. The evolved high rate packet data system may be throttled using data session throttling with a soft throttling timer. Throttling of the evolved high rate packet data system may be discontinued when the soft throttling timer expires. A soft throttling time used by the soft throttling timer may be dependent on a soft failure count.

The type of failure may be an Extensible Authentication Protocol Method for Universal Mobile Telecommunications System Authentication and Key Agreement failure. The application may be notified of the failure. The evolved high rate packet data system may be throttled using data session throttling with a hard throttling timer. Throttling of the evolved high rate packet data system may be discontinued when the hard throttling timer expired.

The type of failure may be a Vendor-Specific Network Control Protocol negotiation failure. The application may be notified of the failure. Packet data network level throttling may be performed. The request for a data call may be on a system that is currently throttled by data session throttling. The wireless communication device may be in hybrid mode in an auto silent redial state with 1× service. The data call may be attempted on a 1× system.

The request for a data call may be on a system that is currently throttled by data session throttling. The wireless communication device may not be in hybrid mode in an auto silent redial state with 1× service. An error may be returned to the application.

The wireless communication device may have an established data session with a 1×/high rate packet data system for a first application. A request for a data call may be received from a second application that supports evolved high rate packet data only mode. The data call may be placed over the 1×/high rate packet data system. The data call may be torn down once connected. The data call may be attempted over an evolved high rate packet data system if the established data session ends, a point-to-point protocol session is brought down and a throttling timer associated with the evolved high rate packet data system has expired.

A wireless device configured for optimizing data retry mechanisms is also described. The wireless device includes a processor, memory in electronic communication with the processor and instructions stored in the memory. The instructions are executable by the processor to attempt to originate a data call on an evolved high rate packet data system. The instructions are also executable by the processor to determine that originating the data call has failed. The instructions are further executable by the processor to determine a type of failure that caused the data call to fail. The instructions are also executable by the processor to reduce the frequency of data call origination attempts based on the type of failure.

A method for optimizing data retry mechanisms is described. The method includes tracking whether a wireless communication device is operating in an evolved high rate packet data only silent redial state or in an auto silent redial state. The method also includes determining whether to implement throttling on systems on which to attempt a data call origination based on the state.

The method may be performed by the wireless communication device. A packet data call may be attempted over a data optimized system. It may be determined that the packet data call attempt has failed. Silent redial may be performed over the same or more preferred data optimized systems in a preferred roaming list for a silent redial period.

Performing silent redial may include incrementing a current failure count and a total failure count each time a call attempt fails. Performing silent redial may also include starting a new attempts timer when a call attempt fails. Performing silent redial may further include resetting the new attempt timer if a new call attempt occurs before the new attempts timer has expired. Performing silent redial may also include resetting the current failure count if the new attempts timer expires.

The method may also include switching to operating in the auto silent redial state if the current failure count equals a current failure threshold or the total failure count equals a total failure threshold during the silent redial period. An evolved high rate packet data only silent redial state may be maintained if the current failure count is less than a current failure threshold and the total failure count is less than a total failure threshold during the silent redial period.

The wireless device may be operating in the auto silent redial state. The packet data call may have succeeded during the silent redial period. The packet data call may have been made on an evolved high rate packet data system. A data session throttling counter associated with a current evolved high rate packet data system may be cleared. The method may include switching to an evolved high rate packet data only silent redial state. The current failure count may be reset. The total failure count may be reset.

The wireless may be operating in the auto silent redial state and the packet data call may have not succeeded during the silent redial period. The method may include maintaining the auto silent redial state. If the packet data call has succeeded during the silent redial period and the packet data call was not made on an evolved high rate packet data system, the method may include maintaining in the auto silent redial state.

The wireless communication device may be operating in the evolved high rate packet data only silent redial state. A packet data call may be attempted over an evolved high rate packet data system. It may be determined that the packet data call attempt has failed. Silent redial may be performed over the same or more preferred data optimized systems. It may be determined that the packet data call has not succeeded during a silent redial period. A current failure count and a total failure count may be incremented. The method may also include switching to operating in the auto silent redial state if either the current failure count is not less than a current failure threshold or the total failure count is not less than a total failure threshold.

A packet data call may be attempted over an evolved high rate packet data system. It may be determined that the packet data call attempt has succeeded. A throttling counter associated with the evolved high rate packet data system may be cleared. The evolved high rate packet data only silent redial state may be maintained.

A packet data call may be attempted over an evolved high rate packet data system. It may be determined that the packet data call attempt has failed. Silent redial may be performed over the same or more preferred data optimized systems. It may be determined that the packet data call has not succeeded during a silent redial period. A current failure count and a total failure count may be incremented. The evolved high rate packet data only silent redial state may be maintained if both the current failure count is less than a current failure threshold and the total failure count is less than a total failure threshold.

A wireless device configured for optimizing data retry mechanisms is described. The wireless device includes a processor, memory in electronic communication with the processor and instructions stored in the memory. The instructions are executable by the processor to track whether the wireless device is operating in an evolved high rate packet data only silent redial state or in an auto silent redial state. The instructions are also executable by the processor to determine whether to implement throttling on systems on which to attempt a data call origination based on the state.

An apparatus for optimizing data retry mechanisms is also described. The apparatus includes means for attempting to originate a data call on an evolved high rate packet data system. The apparatus also includes means for determining that originating the data call has failed. The apparatus further includes means for determining a type of failure that caused the data call to fail. The apparatus also includes means for reducing the frequency of data call origination attempts based on the type of failure.

A computer-program product for a wireless device configured for optimizing data retry mechanisms is described. The computer-program product includes a non-transitory computer-readable medium having instructions thereon. The instructions include code for causing the wireless device to attempt to originate a data call on an evolved high rate packet data system. The instructions also include code for causing the wireless device to determine that originating the data call has failed. The instructions further include code for causing the wireless device to determine a type of failure that caused the data call to fail. The instructions further include code for causing the wireless device to reduce the frequency of data call origination attempts based on the type of failure.

An apparatus for optimizing data retry mechanisms is also described. The apparatus includes means for tracking whether a wireless communication device is operating in an evolved high rate packet data only silent redial state or in an auto silent redial state. The apparatus also includes means for determining whether to implement throttling on systems on which to attempt a data call origination based on the state.

A computer-program product for a wireless device configured for optimizing data retry mechanisms is disclosed. The computer-program product includes a non-transitory computer-readable medium having instructions thereon. The instructions include code for causing the wireless device to track whether a wireless communication device is operating in an evolved high rate packet data only silent redial state or in an auto silent redial state. The instructions also include code for causing the wireless device to determine whether to implement throttling on systems on which to attempt a data call origination based on the state.

A method for optimizing data retry mechanisms is also disclosed. The method includes attempting to originate a data call on an evolved Universal Mobile Telecommunications System Terrestrial Radio Access Network. The method also includes determining that originating the data call has failed. A type of failure that caused the data call to fail is determined. The frequency of data call origination attempts is reduced based on the type of failure.

DETAILED DESCRIPTION

Figure 1:
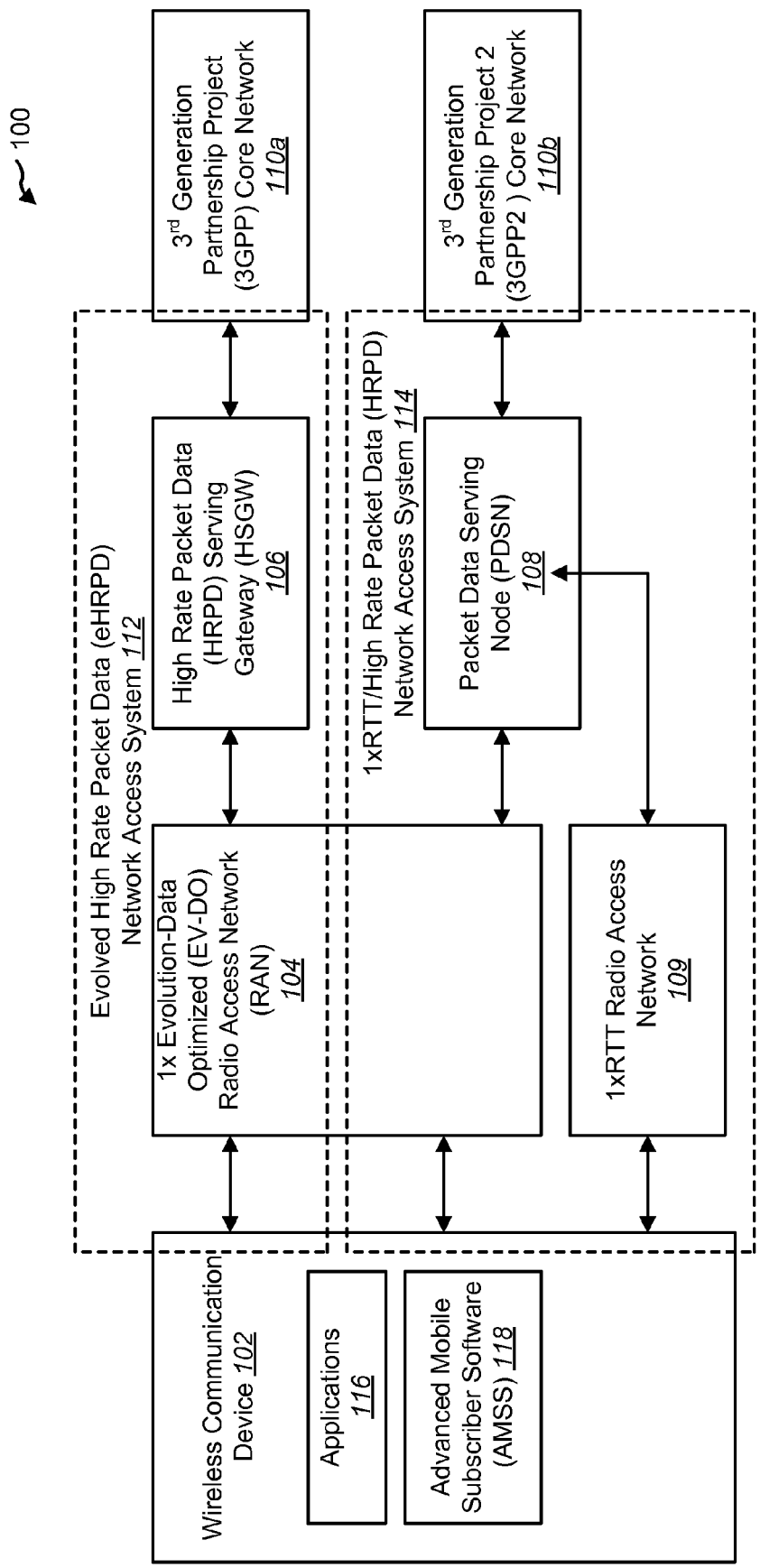
FIG. 1 is a block diagram illustrating a wireless communication network.

FIG. 1 is a block diagram illustrating a wireless communication network 100. A wireless communication network 100 may provide communication services for many different types of electronic devices. Such devices include, but are not limited to, cellular telephones, wireless modems, computers, digital music players, Global Positioning System units, Personal Digital Assistants, gaming devices, etc. As used herein, the term "wireless communication device 102" refers to an electronic device that may be used for voice and/or data communication over a wireless communication network 100. Examples of wireless communication devices 102 include cellular phones, handheld wireless devices, wireless modems, laptop computers, personal computers, etc. A wireless communication device 102 may alternatively be referred to as an access terminal, a mobile terminal, a subscriber station, a remote station, a user terminal, a terminal, a subscriber unit, user equipment (UE), etc.

A wireless communication network 100 may provide communication for a number of wireless communication devices 102, each of which may be serviced by a base station (not shown). A base station may alternatively be referred to as an access point, a Node B, or some other terminology. A base station may be part of a 1x evolution-data optimized (EV-DO) radio access network (RAN) 104. A 1x evolution-data optimized (EV-DO) radio access network (RAN) 104 is a part of a mobile telecommunication system that implements a radio access technology. A 1x evolution-data optimized (EV-DO) radio access network (RAN) 104 may include multiple base stations. Each base station may provide access to the same or different core networks 110.

A wireless communication device 102 may obtain service via multiple network access systems. For example, the wireless communication device 102 may obtain access to core networks 110 via high rate packet data (HRPD) systems, evolved high rate packet data (eHRPD) systems 112 and data optimized (DO) systems such as a 1x evolution data optimized (1x EV-DO) system. A high rate packet data (HRPD) system may connect to a packet data serving node (PDSN) that in turn connects to a $3^{rd}$ Generation Partnership Project 2 (3GPP2) core network. An evolved high rate packet data (eHRPD) system 112 may connect to a high rate packet data (HRPD) serving gateway (HSGW) 106 that is connected to a $3^{rd}$ Generation Partnership Project (3GPP) core network. Both a high rate packet data (HRPD) system and an evolved high rate packet data (eHRPD) system 112 may use the evolution-data optimized (EV-DO) air interface. A 1xRTT system may connect to a packet data serving node (PDSN) that in turn connects to the $3^{rd}$ Generation Partnership Project 2 (3GPP2) core network.

A network access system may be referred to as a system herein. Each network access system may provide access to a core network 110. In an evolved high rate packet data (eHRPD) system 112, the 1x evolution-data optimized (EV-DO) radio access network (RAN) 104 may provide communication with a $3^{rd}$ Generation Partnership Project (3GPP) core network 110a via a high rate packet data (HRPD) serving gateway (HSGW) 106. The $3^{rd}$ Generation Partnership Project (3GPP) is a collaboration between telecommunication associations to make a globally applicable third generation (3G) system specification based on evolved Global System for Mobile Communications (GSM). In a 1xRTT/high rate packet data (HRPD) system 114, the 1xRTT radio access network 109 may provide communication with a $3^{rd}$ Generation Partnership Project 2 (3GPP2) core network 110b via a packet data serving node (PDSN) 108. The $3^{rd}$ Generation Partnership Project 2 (3GPP2) is a collaboration between telecommunication associations to make a globally applicable third generation (3G) mobile phone system specification using CDMA2000.

A wireless communication device 102 may include multiple applications 116. An application 116 may be a third party generated software program operating on the wireless communication device 102 that seeks access to a core network 110. In one configuration, an application 116 may be an evolved high rate packet data (eHRPD) only application, i.e., the application 116 only allows data calls to be placed over an evolved high rate packet data (eHRPD) system 112. In another configuration, an application 116 may allow data calls to be placed over any available network access system.

A wireless communication device 102 may also include advanced mobile subscriber software (AMSS) 118. The advanced mobile subscriber software (AMSS) 118 refers to the system software running on the mobile device, including operating systems, data and network protocol stacks for all supported technologies, device drivers and control software to setup and manage voice and data calls. The advanced mobile subscriber software (AMSS) 118 may assist an application 116 in setting up and maintaining a data call with a network access system. An advanced mobile subscriber software (AMSS) 118 may also inform an application 116 when a packet data call has failed.

An application 116 on the wireless communication device 102 may trigger the advanced mobile subscriber software (AMSS) 118 to originate a packet data call with a core network 110 via a network access system. The desired core network 110 via a network access system may not always be available for the packet data call. Thus, some packet data call originations may fail. A wireless communication device 102 may repeatedly perform origination attempts after a failure, using network resources and overburdening the 1x evolution-data optimized (EV-DO) radio access network (RAN) 104. To avoid this, Data Session Throttling and/or silent redial may be used on the wireless communication device 102.

In Data Session Throttling, a wireless communication device 102 is prevented from performing excessive origination attempts by throttling or disabling the data call access attempts. Data Session Throttling is used when a wireless communication device 102 originates a data call on a 1xRTT/ high rate packet data (HRPD) network access system 114. Evolved Data Session Throttling is used when a wireless communication device 102 originates a data call on an evolved high rate packet data (eHRPD) system 112. The failures that cause Data Session Throttling in high rate packet data (eHRPD) systems 114 may be different from the failures that cause Evolved Data Session Throttling in evolved high rate packet data (eHRPD) systems 112. Furthermore, failures in evolved high rate packet data (eHRPD) systems 112 are classified differently than failures in high rate packet data (HRPD) systems 114. As used herein, Data Session Throttling may refer to the data session throttling behavior in evolved high rate packet data (eHRPD) systems 112.

Data Session throttling may also be applied to other Radio Access Technologies besides 1xRTT, high rate packet data (HRPD) and evolved high rate packet data (eHRPD). For example, Data Session Throttling may be applied to an Evolved UMTS Terrestrial Radio Access Network (E-UTRAN) that connects to a Third Generation Partnership Project (3GPP) core network. The Data Session Throttling may be performed when core network related failures happen while making data calls on the E-UTRAN.

When a wireless communication device 102 encounters certain failures while originating a data call on an evolved high rate packet data (eHRPD) system 112, the wireless communication device 102 may block the system. System blocking may include system avoidance and system throttling. In system avoidance, the wireless communication device 102 does not select the system for a configured period of time. In system throttling, the wireless communication device 102 does not attempt any data call origination over the throttled system for a configured period of time. If the wireless communication device 102 is camping on a system that is throttled, a data call will be throttled until the wireless communication device 102 moves to a different system that is not throttled. If the wireless communication device 102 stays on a throttled system, the effect of system throttling is equivalent to call throttling.

In silent redial, the advanced mobile subscriber software (AMSS) 118 may retry data call attempts. Instead of waiting for the application 116 to retry a failed packet data call, the advanced mobile subscriber software (AMSS) 118 may delay for a period and then retry the packet data call. The advanced mobile subscriber software (AMSS) 118 may retry the packet data call a prescribed number of times before attempting the packet data call over a less preferred system or informing the application 118 of the failure.

Figure 2:
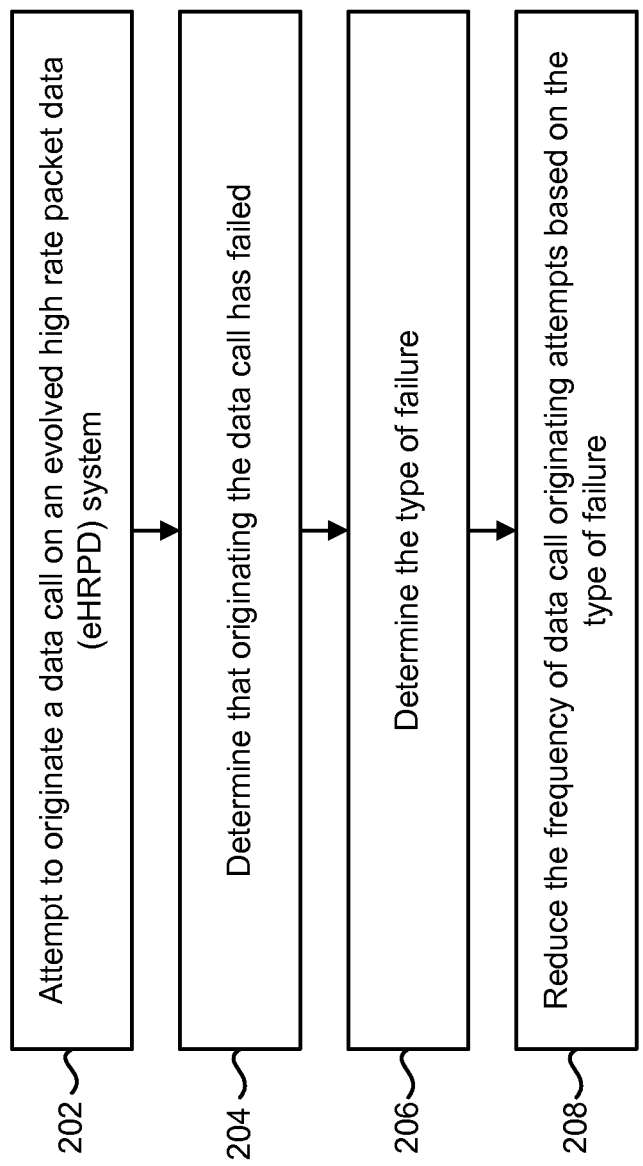
FIG. 2 is a flow diagram of a method for throttling a system using Data Session Throttling.

FIG. 2 is a flow diagram of a method 200 for throttling a system using Data Session Throttling. The method 200 may be performed by a wireless communication device 102. In one configuration, the method 200 may be performed by the advanced mobile subscriber software (AMSS) 118 on the wireless communication device 102. The wireless communication device 102 may attempt 202 to originate a data call on an evolved high rate packet data (eHRPD) system 112. In one configuration, the wireless communication device 102 may attempt 202 to originate a data call based on a request by an application 116 on the wireless communication device 102.

The wireless communication device 102 may determine 204 that originating the data call has failed. Many types of failures may occur when a wireless communication device 102 originates a data call on an evolved high rate packet data (eHRPD) system 112. These failures can happen when an application 116 makes the first packet data call, during silent redial or when the wireless communication device 102 is redirected to an evolved high rate packet data (eHRPD) system 112. The failures include radio layer system failures, point-to-point protocol (PPP) failures, Extensible Authentication Protocol Method for Universal Mobile Telecommunications System (UMTS) Authentication and Key Agreement (EAP-AKA) failures and Vendor-Specific Network Control Protocol (VSNCP) failures.

Radio layer system failures occur during the data call origination but do not cause throttling of the system. Radio layer system failures may be categorized as F failures. Radio layer system failures may be further categorized into Fa and Fb. Fa failures include the radio access system having reached the maximum number of access probes, a high data rate (HDR) protocol mismatch (when HDR handoff fails due to protocol mismatch or the wireless communication device 102 does not support the Paging Channel data rate), an HDR session negotiation timeout, an HDR session abort, an HDR bad system and HDR fades. When an F a failure occurs, the wireless communication device 102 may avoid the network access system over which the failure occurred for a configured period of time. For example, the wireless communication device 102 may avoid the evolved high rate packet data (eHRPD) system 112 for a radio layer system failure time period.

An F b failure may be a connection deny (due to an authentication failure, a billing failure, the network being busy or other reasons). When an F b failure occurs over an evolved high rate packet data (eHRPD) system 112, the wireless communication device 102 does not avoid the evolved high rate packet data (eHRPD) system 112.

Point-to-point protocol (PPP) failures include a link control protocol (LCP) timeout and a point-to-point protocol (PPP) failure due to an option mismatch. Point-to-point protocol (PPP) failures may be categorized as F failures. When a point-to-point protocol (PPP) failure occurs while the wireless communication device 102 originates a data call on an evolved high rate packet data (eHRPD) system 112, the wireless communication device 102 may throttle the evolved high rate packet data (eHRPD) system 112 using the rules of Data Session Throttling. An F failure may be treated as a soft failure. Soft and hard failures are discussed in additional detail below in relation to FIG. 3.

Extensible Authentication Protocol Method for UMTS Authentication and Key Agreement (EAP-AKA) failures may occur when setting up an evolved high rate packet data (eHRPD) point-to-point protocol (PPP) session over an evolved high rate packet data (eHRPD) system 112. Extensible Authentication Protocol Method for UMTS Authentication and Key Agreement (EAP-AKA) failures may be categorized as F failures. When an Extensible Authentication Protocol Method for UMTS Authentication and Key Agreement (EAP-AKA) failure occurs, the advanced mobile subscriber software (AMSS) 118 may perform throttling on the evolved high rate packet data (eHRPD) system 112. An F failure may be treated as a hard failure. Hard and soft failures are discussed in additional detail below in relation to FIG. 3.

Any failure that causes Data Session Throttling may be classified as either a soft failure or a hard failure. Although some failures are indicated herein as being only soft failures or being only hard failures, such a classification may be flexible and can be done based on a service provider's preference. For example, an F failure may be treated as a soft failure instead of a hard failure if the preferences of the service provider are such.

Vendor-Specific Network Control Protocol (VSNCP) negotiation failures may be categorized as F failures. When a Vendor-Specific Network Control Protocol (VSNCP) failure occurs, no throttling of the data call is used. However, throttling of the specific packet data network (PDN) connection can take place using a similar concept of counters and timers.

The wireless communication device 102 may determine 206 the type of failure and respond accordingly. As discussed above, no throttling occurs after an F failure or an F failure. The wireless communication device 102 may reduce 208 the frequency of data call origination attempts based on the type of failure. For example, the wireless communication device 102 may throttle a network access system when an F failure or an F failure occurs. The wireless communication device 102 may block a system for a period of time specified by a throttling timer. In particular, the wireless communication device 102 may maintain the throttling behavior per system (i.e., a throttling timer for each system) identified by a System Identification Number (SID)/Network Identification Number (NID)/Packet Zone Identification (PZID) triple on a 1× network and a subnet identification on an evolved high rate packet data (eHRPD) system 112. The throttling timer for each system may be maintained by the wireless communication device 102 even after the wireless communication device 102 moves to a different system.

If an application 116 requests a data call while the wireless communication device 102 is currently camping on an evolved high rate packet data (eHRPD) system 112 that is throttled by Data Session Throttling, the wireless communication device 102 may not attempt any data call origination on that system. If the wireless communication device 102 is in hybrid mode in the auto silent redial (AUSR) state with 1× service, the wireless communication device may attempt the data call on the 1× system. The auto silent redial (AUSR) state is discussed in further detail below in relation to FIG. 7. Otherwise, the wireless communication device 102 may immediately return an error to the application 116.

If the wireless communication device 102 moves to a new evolved high rate packet data (eHRPD) system 112 that is not throttled by Data Session Throttling, the wireless communication device 102 may attempt the data call origination over the new system upon request by the application 116. Once the throttling timer has expired, the wireless communication device 102 may attempt to connect a data call on that system the next time an application 116 makes a request for a data call. The throttling timer and a failure counter, if applicable, may be reset to zero for a particular network access system if a power cycle or software reset of the wireless communication device 102 occurs. The throttling timer and a failure counter, if applicable, may also be reset to zero for a particular network access system if a data session is successfully established on that network access system (including incoming and outgoing calls) (i.e., the wireless communication device 102 passes the Link Control Protocol (LCP) negotiation and authentication).

The throttling timer and the failure counter, if applicable, may be reset to zero if the wireless communication device's 102 evolved high rate packet data (eHRPD) credentials are re-provisioned. This may be done via Over-The-Air Service Provisioning (OTASP), Over-The-Air Parameter Administration (OTAPA), Over-The-Air Device Management (OTADM), Bearer Independent Protocol (BIP) or Universal Subscriber Identity Module (USIM) swap. A successful re-provisioning of the evolved high rate packet data (eHRPD) credentials for the wireless communication device 102 may clear the throttling behavior for all network access systems. The throttling timer and the failure counter, if applicable, may also be reset to zero if the user changes the operating mode of the wireless communication device 102 or a Number Assignment Module (NAM) change occurs.

Figure 3:
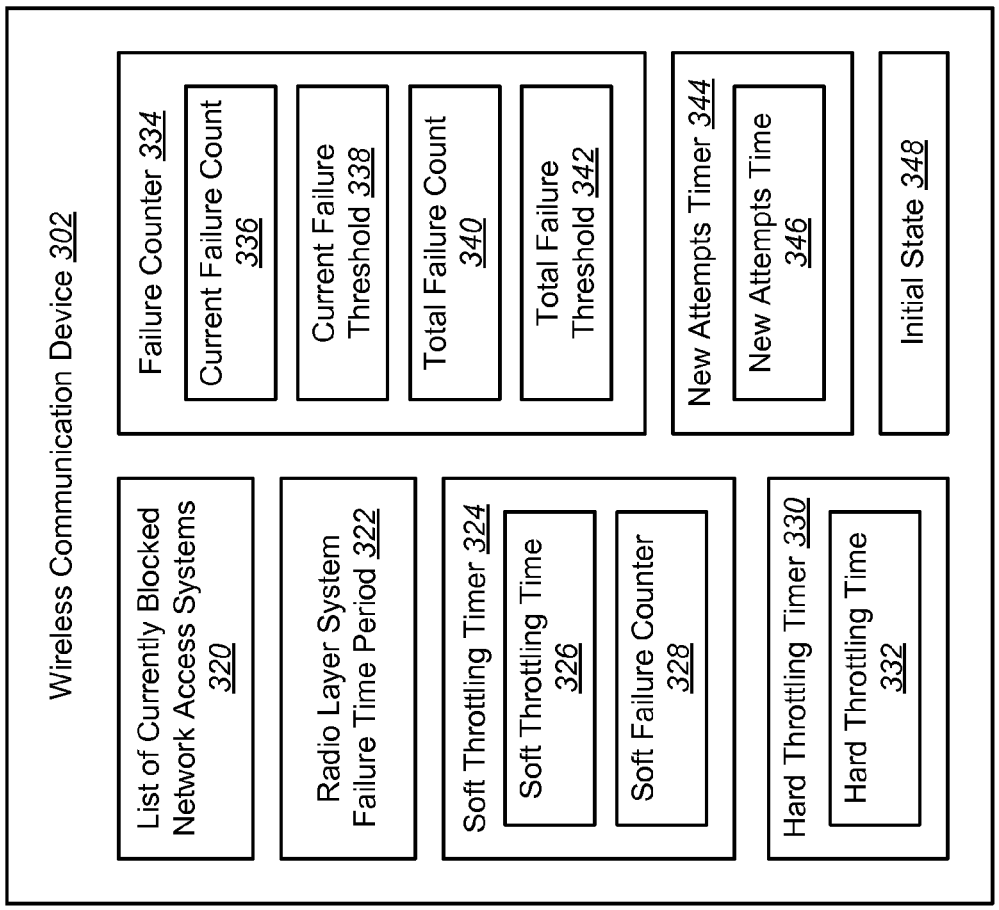
FIG. 3 is a block diagram illustrating various components used by a wireless communication device for Data Session Throttling and silent redial.

FIG. 3 is a block diagram illustrating various components used by a wireless communication device 302 for Data Session Throttling and silent redial. The wireless communication device 302 of FIG. 3 may be one configuration of the wireless communication device 102 of FIG. 1. The wireless communication device 302 may maintain a list 320 of currently blocked network access systems (so as to avoid originating packet data call attempts to those systems). The list 320 of currently blocked network access systems may include network access systems that are throttled and network access systems that are avoided. The wireless communication device 302 may also include a radio layer system failure time period 322 that defines the amount of time the wireless communication device 302 is to avoid a network access system when a radio layer system failure occurs. Radio layer system failures were discussed above in relation to FIG. 2 and are discussed in additional detail below in relation to FIG. 4.

The wireless communication device 302 may include a soft throttling timer 324. The wireless communication device 302 may use the soft throttling timer 324 for those failures that are considered soft failures (i.e., F failures). The soft throttling timer 324 may include a soft throttling time 326 and a soft failure count 328. Each time a soft failure occurs, the soft failure count 328 may be incremented. The soft throttling time 326 may be directly dependent on the soft failure count 328. For example, the soft throttling time 326 may be {0, 0, 0, 1, 2, 8, 15} (in minutes) corresponding to the soft failure count 328 being {1, 2, 3, 4, 5, 6, 7}. The soft throttling time 326 may stay at 15 for soft failure count 328 values above 7. Until the soft throttling timer 324 has expired, the wireless communication device 302 may throttle the network access system using Data Session Throttling.

The wireless communication device 302 may also include a hard throttling timer 330. The wireless communication device 302 may use the hard throttling timer 330 for those failures that are considered hard failures (i.e., F failures). The hard throttling timer 330 may have a hard throttling time 332 that is a finite value with a default of 60 minutes. Until the hard throttling timer 330 has expired, the wireless communication device 302 may throttle the network access system.

The wireless communication device 302 may also include a failure counter 334. The failure counter 334 may count failures that occur within packet call silent redial when the wireless communication device 302 is in an eHRPD only silent redial (EHSR) state. In an eHRPD only silent redial (EHSR) state, the wireless communication device 302 only attempts packet calls over evolved high rate packet data (eHRPD) systems 112. The eHRPD only silent redial (EHSR) state is discussed in additional detail below in relation to FIG. 7. When a failure occurs, the failure counter 334 may increment both a current failure count 336 and a total failure count 340. The current failure count 336 indicates the number of failure attempts of placing a packet data call over evolved high rate packet data (eHRPD) only systems 112. The total failure count 340 indicates the total number of failure attempts of placing the call over evolved high rate packet data (eHRPD) only systems 112. The current failure count 336 may be referred to as DataCallOvereHRPDOnlyFailureCount and the total failure count 340 may be referred to as DataCallOvereHRPDOnlyFailureTotalCount.

The failure counter 334 may include a current failure threshold 338 that indicates the number of failure attempts of placing the call over evolved high rate packet data (eHRPD) only systems 112 before switching to automatic silent redial across evolved high rate packet data (eHRPD), high rate packet data (HRPD) and 1× systems. The current failure threshold 338 may also be referred to as DataCallOvereHR- PDOnlyMaxFailureCount and may be a non-zero positive integer with a default value of 3. If the current failure count 336 reaches the current failure threshold 338, the wireless communication device 302 may switch from the eHRPD only silent redial (EHSR) state to the auto silent redial (AUSR) state. The eHRPD only silent redial (EHSR) state and the auto silent redial (AUSR) state are discussed in additional detail below in relation to FIG. 7.

The failure counter 334 may further include a total failure threshold 342 that indicates the total number of failure attempts of placing the call over evolved high rate packet data (eHRPD) only systems 112 before switching to automatic silent redial across evolved high rate packet data (eHRPD), high rate packet data (HRPD) and 1× systems. The total failure threshold 342 may also be referred to as DataCall-OvereHRPDOnlyMaxFailureTotalCount and is a non-zero positive integer with a default value of 6. If the total failure count 340 reaches the total failure threshold 342, the wireless communication device 302 may switch from the eHRPD only silent redial (EHSR) state to the auto silent redial (AUSR) state.

The wireless communication device 302 may include a new attempts timer 344 with a new attempts time 346. The new attempts timer 344 may indicate the maximum period of time from the last call attempt failure that new call attempts are expected. Each time a failure occurs in either the eHRPD only silent redial (EHSR) state or the auto silent redial (AUSR) state, the wireless communication device 302 may start the new attempts timer 344. If no additional call attempts are made before the new attempts timer 344 expires, the wireless communication device 302 may reset the current failure count 336 (but not the total failure count 340). The new attempts timer 344 may also be referred to as DataCall-NewAttemptMaxtimer and may have a default value of 5 minutes.

The wireless communication device 302 may also include an initial state 348. The initial state 348 may be a binary value that indicates whether the wireless communication device 302 is to start in the eHRPD only silent redial (EHSR) state or the auto silent redial (AUSR) state. A value of 1 for the initial state 348 indicates that the wireless communication device 302 initially enters the eHRPD only silent redial (EHSR) state and attempts only over evolved high rate packet data (eHRPD) systems 112 (eHRPD only mode). A value of 0 for the initial state 348 indicates that the wireless communication device 302 initially enters the auto silent redial (AUSR) state and performs automatic silent redial across evolved high rate packet data (eHRPD), high rate packet data (HRPD) and 1× systems (Auto mode). The initial state 348 may be referred to as DataCallOvereHRPDOnlyFlag and may have a default value of 1.

Figure 4:
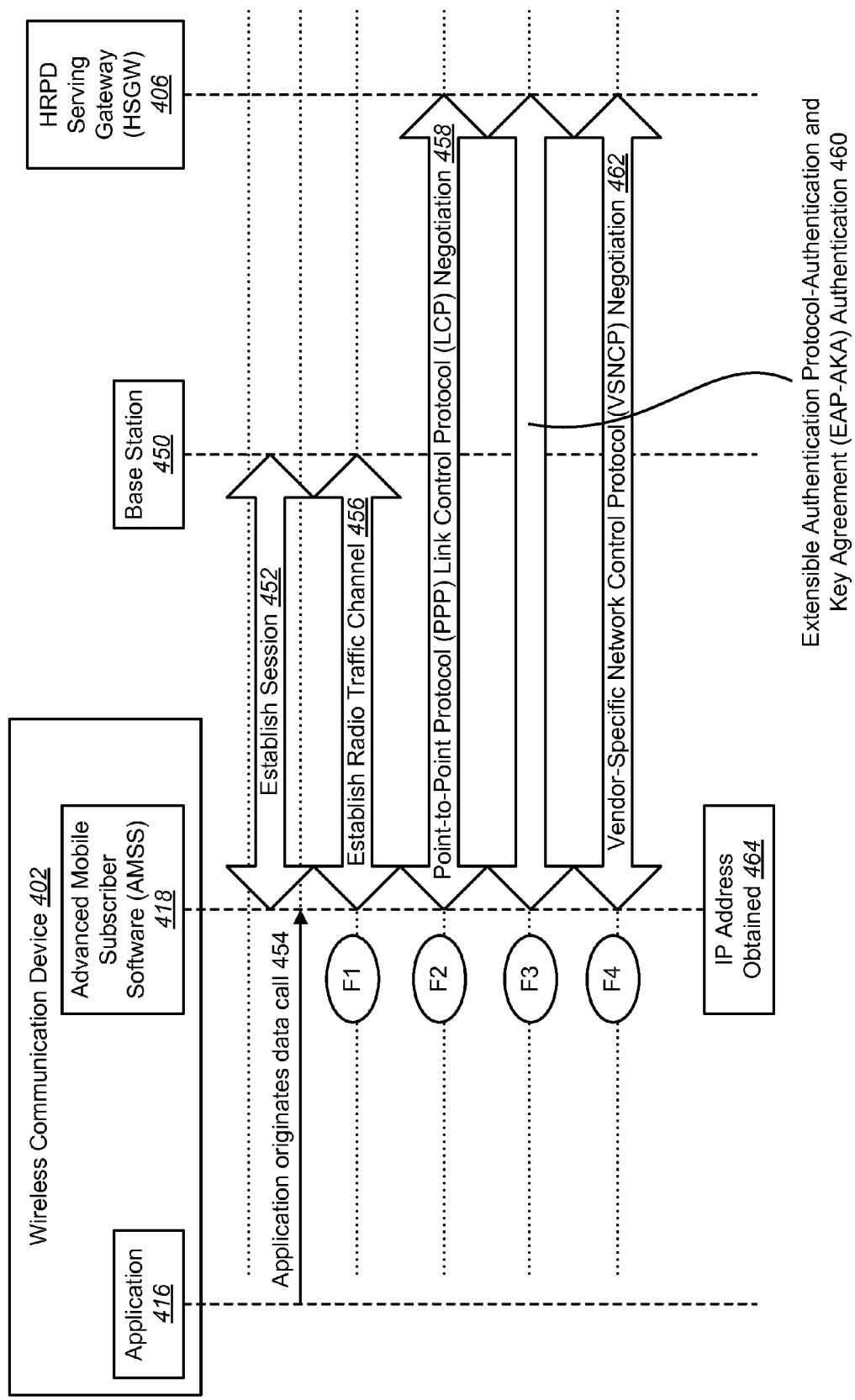
FIG. 4 is a timing diagram illustrating the origination of a packet data call by a wireless communication device.

FIG. 4 is a timing diagram illustrating the origination of a packet data call by a wireless communication device 402. The wireless communication device 402 of FIG. 4 may be one configuration of the wireless communication device 102 of FIG. 1. The wireless communication device 402 may include an application 416 and an advanced mobile subscriber software (AMSS) 418. The wireless communication device 402 may be in evolved high rate packet data (eHRPD) personality. The advanced mobile subscriber software (AMSS) 418 may establish 452 a session with a base station 450 that is part of a 1× evolution-data optimized (EV-DO) radio access network (RAN) 104. The application 416 may then originate 454 a data call in the form of a request sent to the advanced mobile subscriber software (AMSS) 418. Upon receiving the request for a data call from the application 416, the advanced mobile subscriber software (AMSS) 418 may begin point-to-point protocol (PPP) establishment procedures.

Radio link signaling is exchanged between the advanced mobile subscriber software (AMSS) 418 and the base station 450 to establish 456 a radio traffic channel. An F failure may occur during the establishment 456 of the radio traffic channel. If an F failure occurs, the advanced mobile subscriber software (AMSS) 418 may declare an origination failure and notify the application 416. The advanced mobile subscriber software (AMSS) 418 may then avoid the network access system for a radio layer system failure time period 322. The application 416 is free to retry originating 454 another data call. If the application 416 does originate 454 another data call before the radio layer system failure time period 322 has expired, the data call will be tried on systems that are not avoided by the advanced mobile subscriber software (AMSS) 418.

If the radio traffic channel is successfully established, the wireless communication device 402 and the HRPD serving gateway (HSGW) 406 may perform point-to-point protocol (PPP) Link Control Protocol (LCP) negotiation 458. An F failure may occur during the point-to-point protocol (PPP) Link Control Protocol (LCP) negotiation 458. The advanced mobile subscriber software (AMSS) 418 may declare the origination failure and notify the application 416. The network access system over which the advanced mobile subscriber software (AMSS) 418 attempted the data call origination may be throttled via Data Session Throttling with the soft throttling time 326 set according to the soft failure counter 328 (i.e., {0, 0, 0, 1, 2, 8, 15} minutes for {1, 2, 3, 4, 5, 6, 7} failures). If the network access system selection procedure does not change to a different network access system (i.e., the wireless communication device 402 continues to use the now throttled network access system), data origination will be throttled over data optimized (DO) network access systems until the soft throttling timer 324 has expired. If the wireless communication device 402 is in a hybrid mode and in the auto silent redial (AUSR) state with 1× service, the data call may be attempted over the 1× network access system. The auto silent redial (AUSR) state is discussed in further detail below in relation to FIG. 7.

After the point-to-point protocol (PPP) Link Control Protocol (LCP) negotiation 458, Extensible Authentication Protocol Method for UMTS Authentication and Key Agreement (EAP-AKA) authentication 460 may be performed among the wireless communication device 402, the HRPD serving gateway (HSGW) 406, the 3GPP2 AAA server and the 3GPP AAA server. An F failure may occur during the Extensible Authentication Protocol Method for UMTS Authentication and Key Agreement (EAP-AKA) authentication 460. As discussed above, an F failure is a hard failure. The advanced mobile subscriber software (AMSS) 418 may declare the origination failure and notify the application 416. The network access system over which the advanced mobile subscriber software (AMSS) 418 attempted the data call origination may then be throttled via Data Session Throttling with the hard throttling time 332 set to 60 minutes.

If the network access system selection procedure does not change to a different network access system, data origination will be throttled over data-optimized (DO) network access systems until the hard throttling timer 330 expires. If the wireless communication device 402 is in a hybrid mode and in the auto silent redial (AUSR) state with 1× service, the data call may be attempted over the 1× network access system. Because the Extensible Authentication Protocol Method for UMTS Authentication and Key Agreement (EAP-AKA) authentication 460 failed, the Link Control Protocol (LCP)

authentication also fails and the point-to-point protocol (PPP) session does not exist. However, the data optimized (DO) session does exist.

If the Extensible Authentication Protocol Method for UMTS Authentication and Key Agreement (EAP-AKA) authentication 460 is performed successfully, the wireless communication device 402, the HRPD serving gateway (HSGW) 406 and other network elements may perform the Vendor-Specific Network Control Protocol (VSNCP) negotiation 462. An F failure may occur during the Vendor-Specific Network Control Protocol (VSNCP) negotiation 462. As discussed above, an F failure does not cause data throttling. However, throttling of the specific packet data network (PDN) connection can take place using a similar concept of counters and timers. One packet data network (PDN) attach failure does not imply failures for other packet data network (PDN) connections. The advanced mobile subscriber software (AMSS) 418 may declare the origination failure and notify the application 416. The advanced mobile subscriber software (AMSS) 418 may retry the Vendor-Specific Network Control Protocol (VSNCP) negotiation 462 if triggered to do so by the application 416. If there is no other application attached to the point-to-point protocol (PPP), then the point-to-point protocol (PPP) is torn down. However, the data optimized (DO) session still exists. If the Vendor-Specific Network Control Protocol (VSNCP) negotiation 462 is successful, an IP address is obtained 464 and the packet data call is established.

Figure 5:
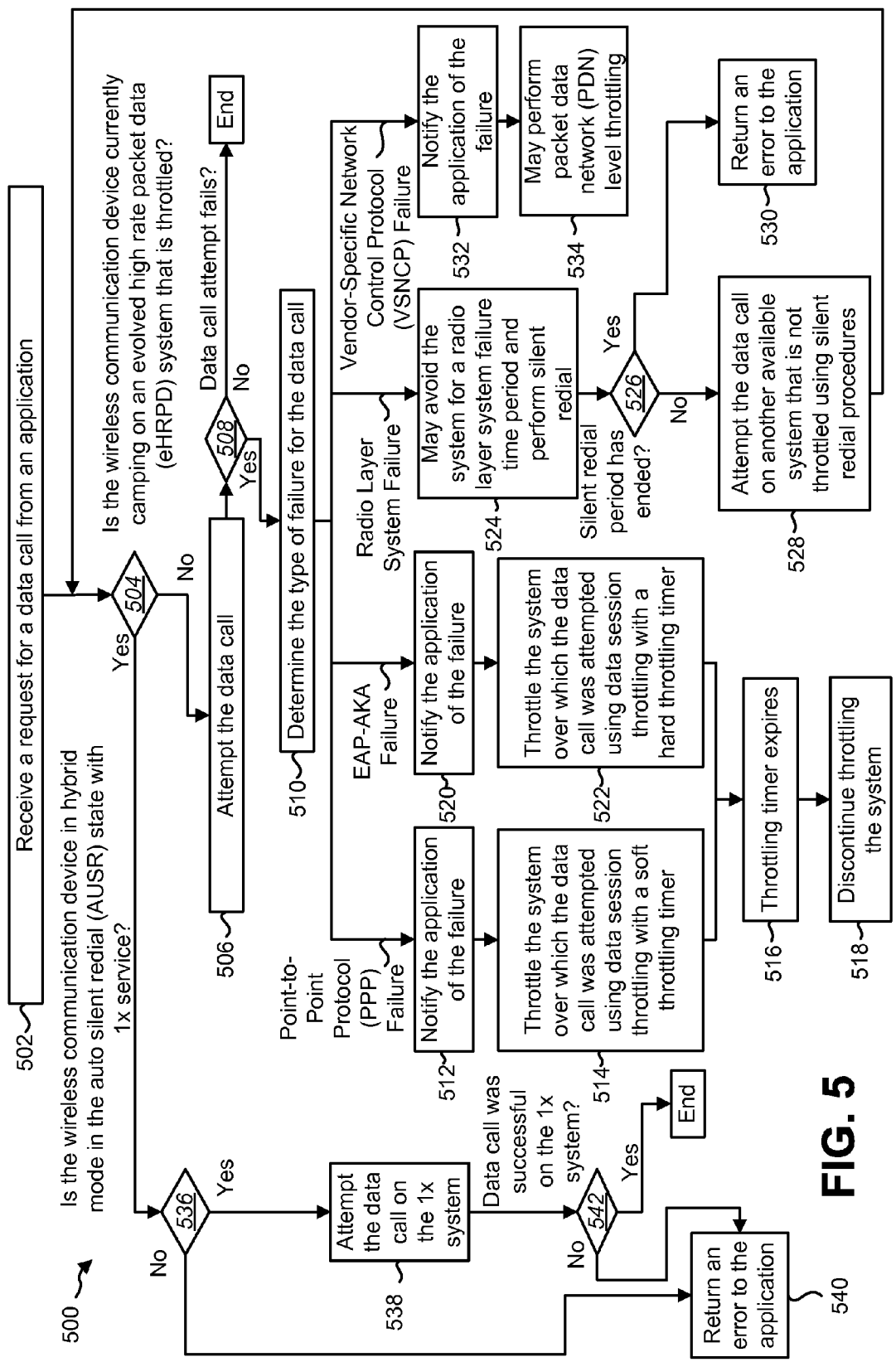
FIG. 5 is a flow diagram of a method for throttling an evolved high rate packet data (eHRPD) network access system.

FIG. 5 is a flow diagram of a method 500 for throttling an evolved high rate packet data (eHRPD) network access system 112. The method 500 may be performed by a wireless communication device 102. In one configuration, the method 500 may be performed by an advanced mobile subscriber software (AMSS) 118 of a wireless communication device 102. The wireless communication device 102 may receive 502 a request for a data call from an application 116 on the wireless communication device 102. The wireless communication device 102 may determine 504 whether the wireless communication device 102 is currently camping on an evolved high rate packet data (eHRPD) 112 network access system that is throttled by Data Session Throttling.

If the wireless communication device 102 is currently camping on an evolved high rate packet data (eHRPD) 112 network access system that is throttled by Data Session Throttling, the wireless communication device 102 may determine 536 whether the wireless communication device 102 is in hybrid mode in the auto silent redial (AUSR) state with 1× service. If the wireless communication device 102 is in hybrid mode in the auto silent redial (AUSR) state with 1× service, the wireless communication device 102 may attempt 538 the data call on the 1× system. The auto silent redial (AUSR) state is discussed in further detail below in relation to FIG. 7.

The wireless communication device 102 may then determine 542 whether the data call was successful on the 1× system. If the data call was successful on the 1× system, the method 500 ends. If the data call was not successful on the 1× system, the wireless communication device may return 540 an error to the application 116.

If the wireless communication device 102 is not in hybrid mode in the auto silent redial (AUSR) state with 1× service, the wireless communication device 102 may return 540 an error to the application 116.

If the wireless communication device 102 is not currently camping on an evolved high rate packet data (eHRPD) 112 network access system that is throttled by Data Session Throttling, the wireless communication device 102 may attempt 506 the data call. The wireless communication device 102 may determine 508 whether the data call attempt fails. If the data call attempt does not fail (i.e., is successful), then the method 500 ends. If the data call attempt fails, the wireless communication device 102 may determine 510 the type of failure for the data call. As discussed above, the types of failure for the data call include a radio layer system failure (F ), a point-to-point protocol (PPP) failure (F ), an Extensible Authentication Protocol Method for UMTS Authentication and Key Agreement (EAP-AKA) failure (F ) and a Vendor-Specific Network Control Protocol (VSNCP) failure (F ).

When the failure is a radio layer system failure, the wireless communication device 102 may avoid 524 the system for a radio layer system failure time period 322 and perform silent redial. The wireless communication device 102 may then determine 526 whether the silent redial period has ended. If the silent redial period has ended, the wireless communication device 102 may return 530 an error to the application 116. If the silent redial period has not ended, the wireless communication device 102 may attempt 528 the data call on another available system that is not throttled using silent redial procedures. The wireless communication device 102 may then return to determining 504 whether the wireless communication device 102 is currently camping on an evolved high rate packet data (eHRPD) system that is throttled.

If the failure is a point-to-point protocol (PPP) failure, the wireless communication device 102 may notify 512 the application 116 of the failure. The wireless communication device 102 may then throttle 514 the network access system over which the data call was attempted using Data Session Throttling with a soft throttling timer 324. As discussed above, the soft throttling time 326 may depend on the number of soft failures (i.e., the soft failure count 328) encountered by the wireless communication device 102. Once the throttling timer has expired 516, the wireless communication device 102 may discontinue 518 throttling the system.

When the failure is an Extensible Authentication Protocol Method for UMTS Authentication and Key Agreement (EAP-AKA) failure, the wireless communication device 102 may notify 520 the application 116 of the failure. The wireless communication device 102 may then throttle 522 the network access system over which the data call was attempted using Data Session Throttling with a hard throttling timer 330. As discussed above the hard throttling time 332 may be 60 minutes. Once the throttling timer has expired 516, the wireless communication device 102 may discontinue 518 throttling the system.

If the failure is a Vendor-Specific Network Control Protocol (VSNCP) failure, the wireless communication device 102 may notify 532 the application 116 of the failure. The wireless communication device 102 may then perform 534 packet data network (PDN) level throttling.

Figure 6:
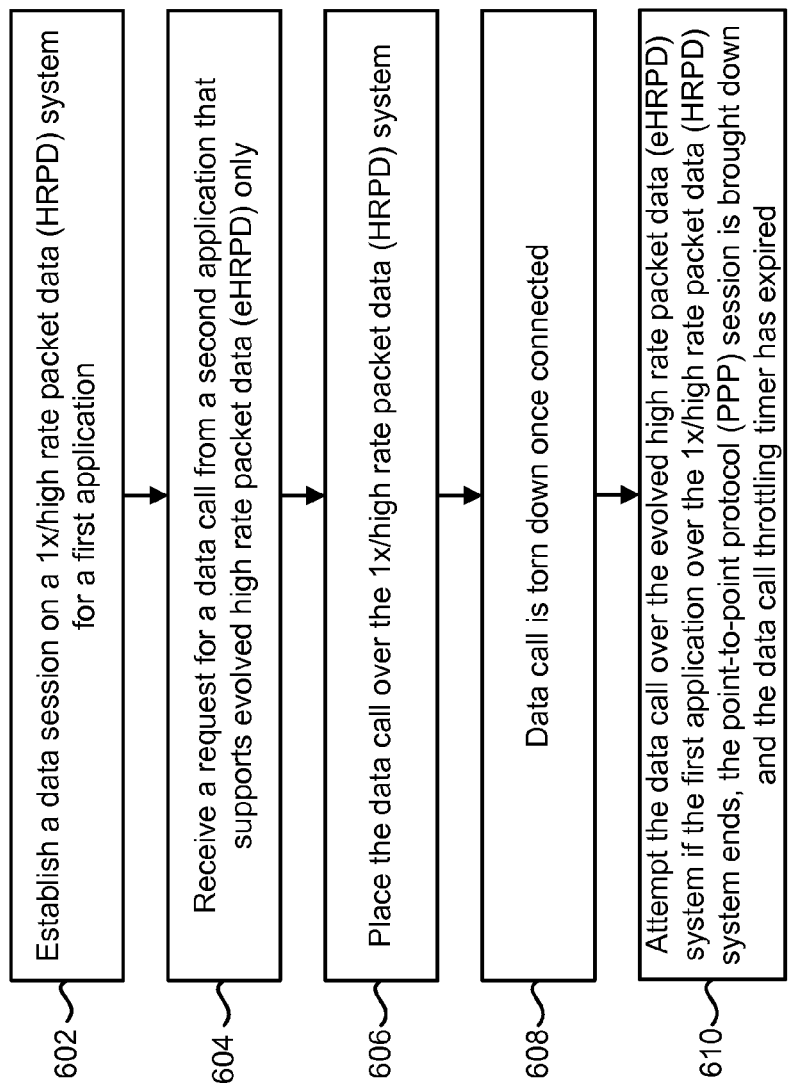
FIG. 6 is a flow diagram of a method for originating an evolved high rate packet data (eHRPD) only data call when a data session on 1x/high rate packet data (HRPD) already exists.

FIG. 6 is a flow diagram of a method 600 for originating an evolved high rate packet data (eHRPD) only data call when a data session on 1×/high rate packet data (HRPD) already exists. The method 600 may be performed by a wireless communication device 102. The wireless communication device 102 may have an active data session on a 1×/high rate packet data (HRPD) system. The Preferred Roaming List (PRL) configuration may be assumed to be that of Table 1, with two evolved high rate packet data (eHRPD) systems 112, two high rate packet data (HRPD) systems and two 1xRTT/high rate packet data (HRPD) network access systems 114. The evolved high rate packet data (eHRPD) systems 112 and the high rate packet data (HRPD) systems may be associated with the 1xRTT/high rate packet data (HRPD) network access systems 114. The evolved high rate packet data (eHRPD) systems 112 are the most preferred systems in the current geographic area and associate set. The evolved high rate packet data (eHRPD) systems 112 may each have the same priority.

| System | Geographic Area | Priority | Assn Tag |
|---|---|---|---|
| eHRPD_1 | New | Same | 1 |
| eHRPD_2 | Same | More | 1 |
| HRPD_1 | Same | Same | 1 |
| HRPD_2 | Same | More | 1 |
| 1x_1 | Same | Same | 1 |
| 1x_2 | Same | Same | 1 |

The wireless communication device 102 may establish 602 a data session on a 1x/high rate packet data (HRPD) system for a first application 116 (i.e., the data session that is active on the 1x/high rate packet data (HRPD) system). The wireless communication device 102 may then receive 604 a request for a packet data call from a second application 116 that supports evolved high rate packet data (eHRPD) only. Although the wireless communication device 102 failed to connect the first data call over the evolved high rate packet data (eHRPD) systems 112 (because the evolved high rate packet data (eHRPD) systems 112 have a higher priority but the data call is active on a 1x/high rate packet data (HRPD) system), the wireless communication device 102 is still in hybrid mode. One or both of the evolved high rate packet data (eHRPD) systems 112 may be blocked in the list 320 of currently blocked network access systems on the wireless communication device 302.

When the second application 116 places the second packet call, the second packet call is placed 606 over the 1x/high rate packet data (HRPD) system. Since the second application 116 supports evolved high rate packet data (eHRPD) only, the second packet call is torn down 608 after it is connected. The wireless communication device 102 may then attempt 610 the second packet data call over the evolved high rate packet data (eHRPD) system 112 if the first application 116 over the 1x/high rate packet data (HRPD) system ends and the point-to-point protocol (PPP) session is brought down (thereby returning the wireless communication device 102 to camping on an evolved high rate packet data (eHRPD) system 112) and the corresponding eDCTM timer (i.e., a throttling timer) expires.

If the second packet data call succeeds over an evolved high rate packet data (eHRPD) system 112, subsequent packet data calls may be attempted over evolved high rate packet data (eHRPD). If the advanced mobile subscriber software (AMSS) 118 declares a failure, the second application 116 may retry or give up.

Figure 7:
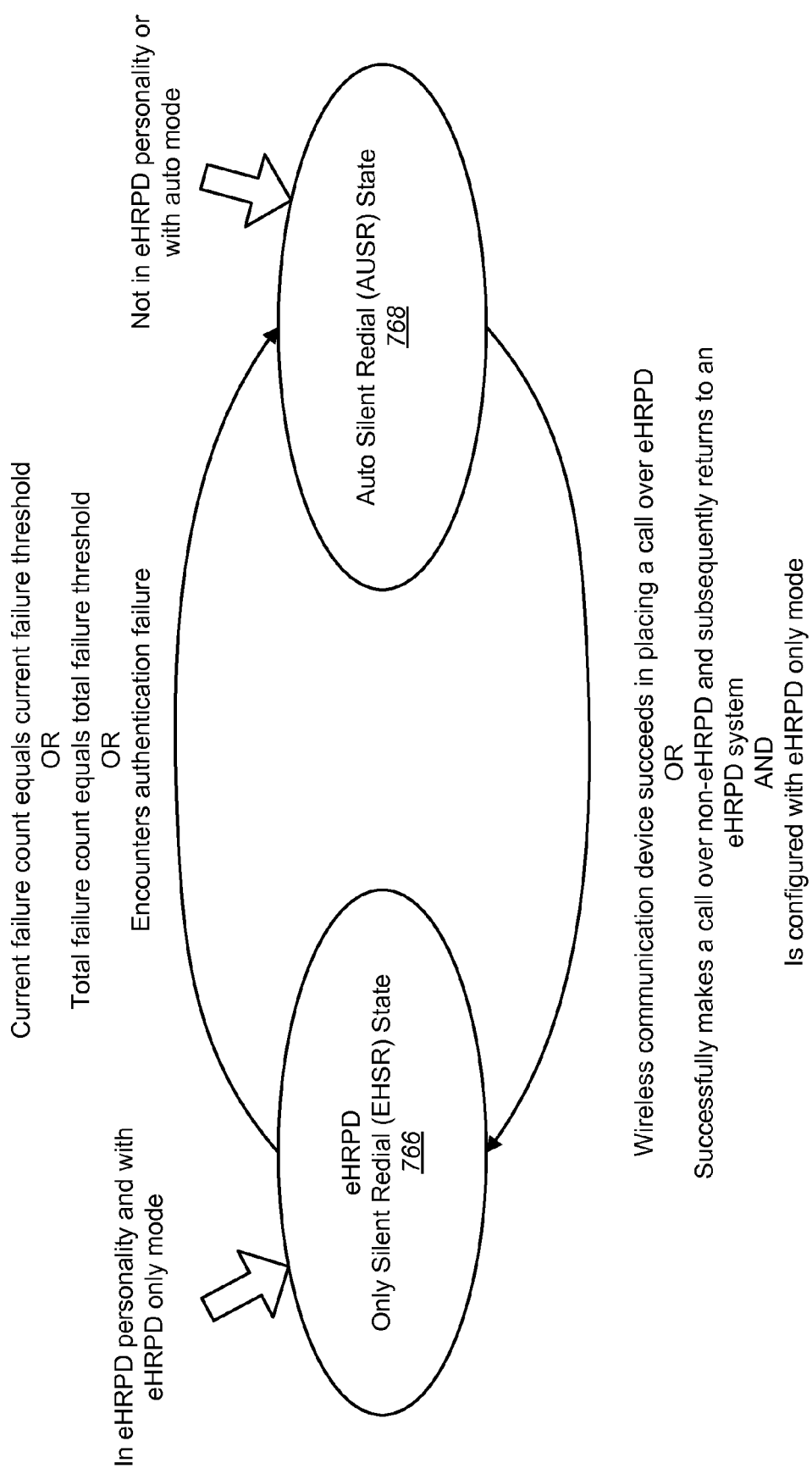
FIG. 7 is a block diagram illustrating the different states of a wireless communication device when the wireless communication device performs packet call silent redial.

FIG. 7 is a block diagram illustrating the different states of a wireless communication device 102 when the wireless communication device 102 performs packet call silent redial. Packet call silent redial does not apply to VoIP calls. There are two states for evolved high rate packet data (eHRPD) packet call silent redial: the eHRPD only silent redial (EHSR) state 766 and the auto silent redial (AUSR) state 768. When a wireless communication device 102 is in the eHRPD only silent redial (EHSR) state 766, the wireless communication device 102 only attempts data calls over evolved high rate packet data (eHRPD) systems 112 if evolved high rate packet data (eHRPD) systems 112 are provisioned to be the most preferred evolution-data optimized (EV-DO) systems in the same geographical area. When a wireless communication device is in the auto silent redial (AUSR) state 768, the wireless communication device 102 may perform automatic silent redial across evolved high rate packet data (eHRPD) systems 112 and other network access systems such as high rate packet data (HRPD) and 1x systems.

The initial state 348 may determine which state the wireless communication device 102 begins in. If the initial state=1 (i.e., the wireless communication device 102 is configured with eHRPD only mode) and the wireless communication device 102 is in eHRPD personality, the initial silent redial state is the eHRPD only silent redial (EHSR) state 766. If the initial state=0 (i.e., the wireless communication device 102 is configured with Auto Mode) or the wireless communication device 102 is not in eHRPD personality, the initial silent redial state is the auto silent redial (AUSR) state 768.

In the eHRPD only silent redial (EHSR) state 766, the wireless communication device 102 is in eHRPD personality and with eHRPD only mode. The wireless communication device 102 may switch from the eHRPD only silent redial (EHSR) state 766 to the auto silent redial (AUSR) state 768 if the current failure count 336 equals the current failure threshold 338, if the total failure count 340 equals the total failure threshold 342 or if the wireless communication device 102 encounters an authentication failure. In the eHRPD only silent redial (EHSR) state 766, the silent redial may be attempted over the same or more preferred data optimized (DO) systems (with respect to the last acquired DO system) that are not avoided.

The silent redial may give up after attempting over the same or more preferred DO systems for the configured period of time from the original attempt. If the wireless communication device 102 moves to a network access system that is throttled by Data Session Throttling, the wireless communication device 102 may fail the call immediately even if the silent redial period has not expired yet. The advanced mobile subscriber software (AMSS) 118 may provide a failure indication to the application 116 and the application 116 is then free to retry the packet data call.

In the auto silent redial (AUSR) state 768, the wireless communication device 102 is either not in eHRPD personality or is configured with Auto Mode. While in the auto silent redial (AUSR) state 768, the wireless communication device 102 may perform silent redial over the available systems in the Preferred Roaming List (PRL) (including the less preferred systems while excluding the systems blocked by Data Session Throttling) for the configured silent redial period before declaring an origination failure. In the auto silent redial (AUSR) state 768, there is a possibility that the wireless communication device 102 may only find evolved high rate packet data (eHRPD) systems 112 due to radio frequency (RF) coverage limitations. In the auto silent redial (AUSR) state 768, the packet call silent redial may be performed in Auto Mode over the network access systems (including evolved high rate packet data (eHRPD), high rate packet data (HRPD) and 1x systems) in the order they are listed in the Preferred Roaming List (PRL), excluding the avoided systems.

The silent redial may give up after making attempts for the configured period of time from the original attempt. If the wireless communication device 102 moves to a DO system that is throttled by Data Session Throttling, the wireless communication device 102 may fall back to 1x immediately. If the wireless communication device 102 moves to a 1x system that is throttled by Data Session Throttling, the wireless communication device 102 may fail the call immediately even if the silent redial period has not expired yet.

The wireless communication device 102 may switch from the auto silent redial (AUSR) state 768 to the eHRPD only silent redial (EHSR) state 766 if the wireless communication device 102 successfully places a packet data call over an evolved high rate packet data (eHRPD) system 112 and the wireless communication device 102 is configured with eHRPD only mode. The wireless communication device 102 may also switch from the auto silent redial (AUSR) state 768 to the eHRPD only silent redial (EHSR) state 766 if the wireless communication device 102 successfully places a packet data call over a high rate packet data (HRPD)/1× system, the wireless communication device 102 is configured with eHRPD only mode and the wireless communication device 102 returns to an evolved high rate packet data (eHRPD) system 112.

When a wireless communication device 102 switches from the auto silent redial (AUSR) state 768 to the eHRPD only silent redial (EHSR) state 766, the wireless communication device 102 may reset the current failure count 336 and the total failure count 340. If a packet data call is unsuccessful, the application 116 may retry or give up and the wireless communication device 102 remains in the auto silent redial (AUSR) state 768.

Figure 8:
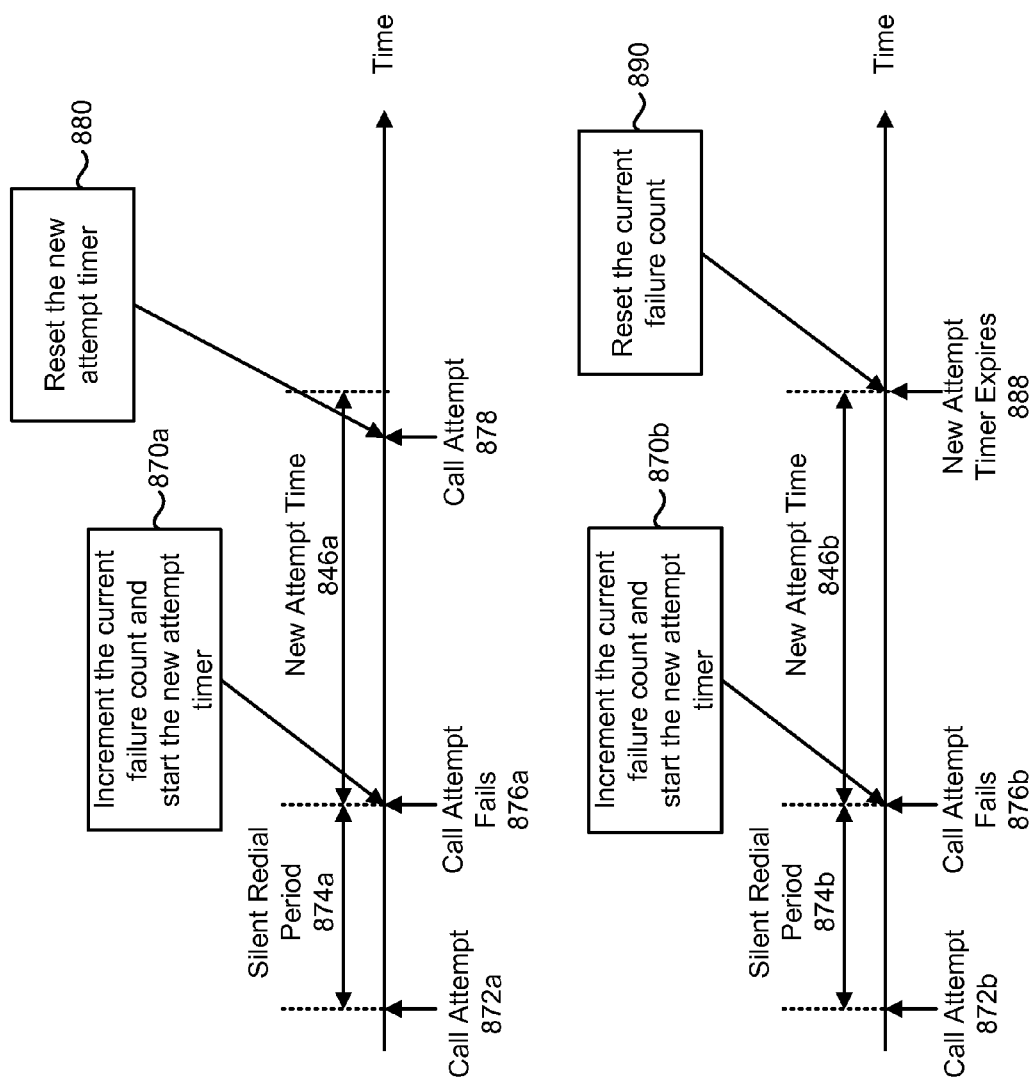
FIG. 8 is a timing diagram illustrating packet call silent redial.

FIG. 8 is a timing diagram illustrating packet call silent redial. A wireless communication device 102 may be in the auto silent redial (AUSR) state 768 or the eHRPD only silent redial (EHSR) state 766. The wireless communication device 102 may make a call attempt 872a-b. After the call attempt 872a-b, a silent redial period 874a-b may occur. A silent redial period 874 may be a fixed configurable time (e.g., 30 seconds). The call attempt may fail 876a-b. The wireless communication device 102 may then increment 870a-b a current failure count 336 and a total failure count 340. The wireless communication device 102 may also start a new attempts timer 344. If another call attempt 878 occurs before the new attempts timer 344 has expired (i.e., during the new attempt time 846a-b), the wireless communication device 102 may reset 880 the new attempts timer 344 and attempt 872 the call. If another call attempt does not occur and the new attempts timer 344 expires 888, the wireless communication device 102 may reset 890 the current failure count 336.

The data call attempt may be placed over multiple systems until it succeeds or the silent redial period 874 has expired (whichever happens first). If the silent redial period 874 has expired and the call attempt did not succeed, the advanced mobile subscriber software (AMSS) may declare the data call a failure.

Figure 9:
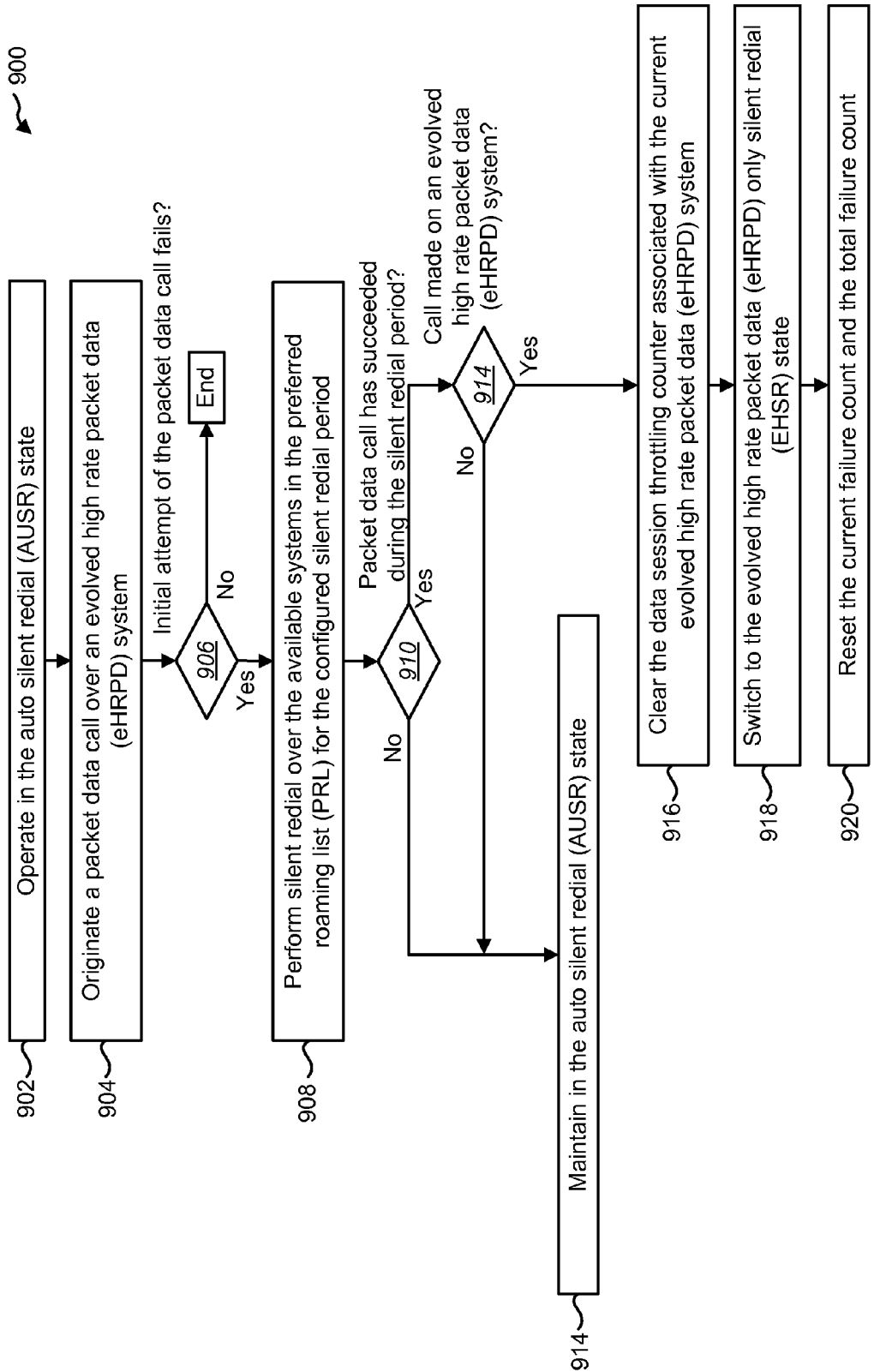
FIG. 9 is a flow diagram of a method for packet call silent redial in the auto silent redial (AUSR) state.

FIG. 9 is a flow diagram of a method 900 for packet call silent redial in the auto silent redial (AUSR) state 768. The method 900 may be performed by a wireless communication device 102. In one configuration, the method 900 may be performed by an advanced mobile subscriber software (AMSS) 118 on the wireless communication device 102. The wireless communication device 102 may operate 902 in the auto silent redial (AUSR) state 768 and be in the eHRPD personality. The wireless communication device 102 may have previously transitioned from the eHRPD only silent redial (EHSR) state 766 to the auto silent redial (AUSR) state 768 based on the state transition from FIG. 7 above.

The wireless communication device 102 may originate 904 a packet data call over an evolved high rate packet data (eHRPD) system 112. The wireless communication device 102 may then determine 906 if the initial attempt of the packet data call has failed. If the initial attempt is successful, the method 900 may end. If the initial attempt fails, the wireless communication device 102 may perform 908 silent redial over the available network access systems in the Preferred Roaming List (PRL) for the configured silent redial period. Silent redial was discussed above in relation to FIG. 8.

The wireless communication device 102 may then determine 910 if the packet data call has succeeded during the silent redial period 874. If the packet data call did not succeed during the silent redial period 874, the wireless communication device 102 may maintain 914 in the auto silent redial (AUSR) state 768. If the packet call can not go through, the application 116 may retry or give up.

If the packet data call has succeeded during the silent redial period 874 and the wireless communication device 102 is configured with eHRPD only mode, the wireless communication device 102 may determine 914 whether the call was made on an evolved high rate packet data (eHRPD) system 112. If the call was not made on an evolved high rate packet date (eHRPD) system 112, the wireless communication device 102 may maintain 914 in the auto silent redial (AUSR) state 768.

If the call was made on an evolved high rate packet date (eHRPD) system 112, the wireless communication device may clear 916 the throttling counter associated with the current evolved high rate packet data (eHRPD) system 112. The wireless communication device 102 may then switch 918 to the eHRPD only silent redial (EHSR) state 766. If the packet data call has succeeded over an high rate packet data (HRPD)/1× system and the wireless communication device 102 is configured with eHRPD only mode, the wireless communication device 102 may switch 918 to the eHRPD only silent redial (EHSR) state 766 once the wireless communication device 102 returns to an evolved high rate packet data (eHRPD) system 112. Once the wireless communication device 102 has returned to the eHRPD only silent redial (EHSR) state 766, the wireless communication device 102 may reset 920 the current failure count 336 and the total failure count 340.

Figure 10:
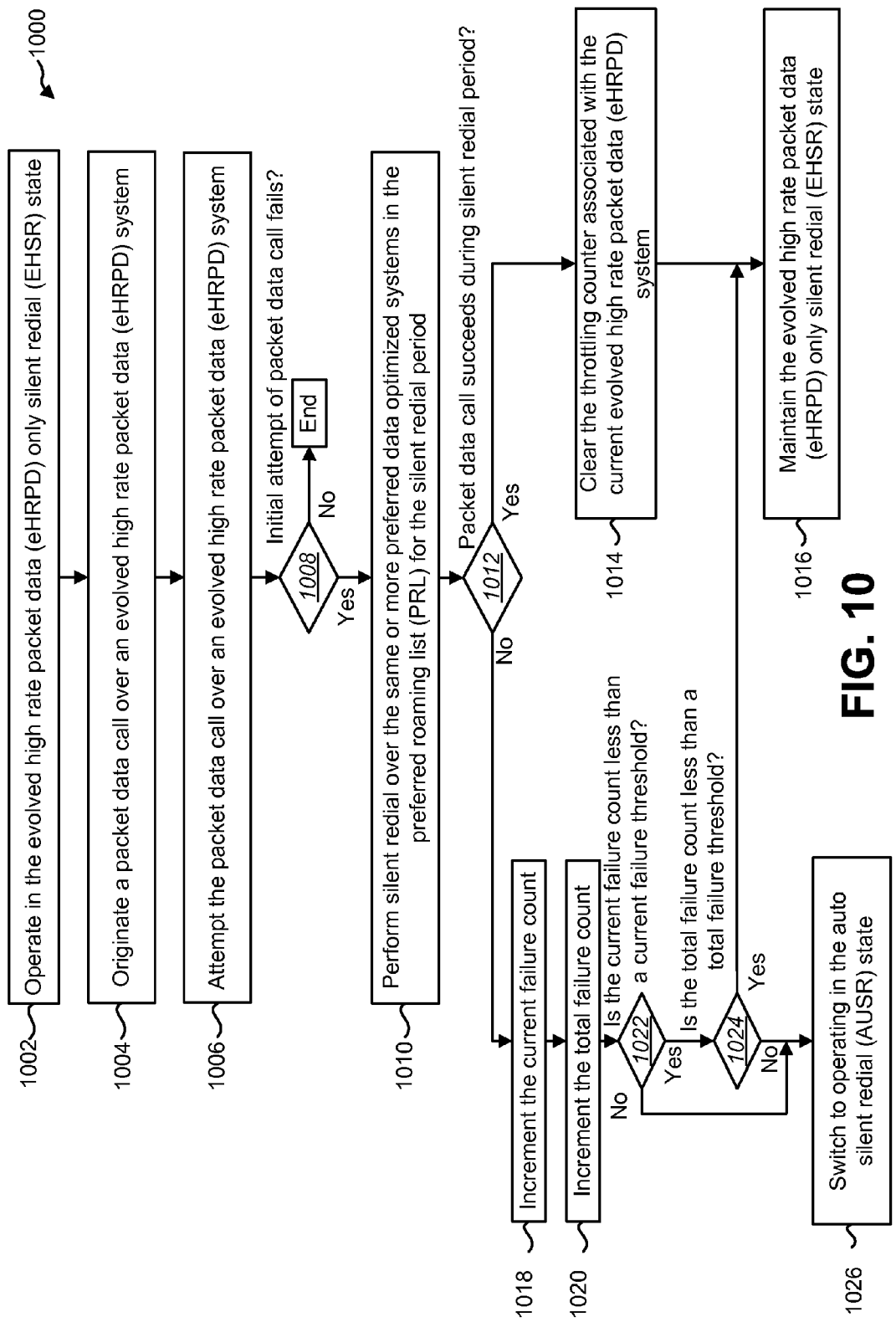
FIG. 10 is a flow diagram of a method for packet call silent redial in the eHRPD only silent redial (EHSR) state.

FIG. 10 is a flow diagram of a method 1000 for packet call silent redial in the eHRPD only silent redial (EHSR) state 766. The method 1000 may be performed by a wireless communication device 102. In one configuration, the method 1000 may be performed by an advanced mobile subscriber software (AMSS) 118 on the wireless communication device 102. The wireless communication device 102 may operate 1002 in the eHRPD only silent redial (EHSR) state 766 and be in the eHRPD personality. The wireless communication device 102 may originate 1004 a packet data call over an evolved high rate packet data (eHRPD) system 112. The wireless communication device attempt 1006 the packet data call over the evolved high rate packet data (eHRPD) system 112. The wireless communication device 102 may then determine 1008 whether the initial attempt of the packet data call has failed. If the initial attempt has succeeded, the method 1000 ends.

If the initial attempt has failed, the wireless communication device 102 may perform 1010 silent redial over the same or more preferred DO systems in the Preferred Roaming List (PRL) for the silent redial period 874. Performing silent redial was discussed above in relation to FIG. 8. The wireless communication device 102 may then determine 1012 whether the packet data call has succeeded during the silent redial period 874. If the packet data call has not succeeded during the silent redial period, the wireless communication device 102 may increment 1018 the current failure count 336. The wireless communication device 102 may also increment 1020 the total failure count 340.

The wireless communication device 102 may then determine 1022 if the current failure count 336 is less than a current failure threshold 338. If the current failure count 336 is not less than the current failure threshold 338, the wireless communication device 102 may switch 1026 to operating in the auto silent redial (AUSR) state. If the current failure count 336 is less than the current failure threshold 338, the wireless communication device 102 may determine 1024 whether the total failure count 340 is less than a total failure threshold 342. If the total failure count 340 is not less than the total failure threshold 342, the wireless communication device 102 may switch 1026 to operating in the auto silent redial (AUSR) state. Also, if the call fails due to an authentication failure, the wireless communication device 102 may switch 1026 to operating in the auto silent redial (AUSR) state. If the total failure count 340 is less than a total failure threshold 342, the wireless communication device 102 may maintain 1016 the evolved high rate packet data (eHRPD) only silent redial (EHSR) state.

If the packet data call has succeeded during the silent redial period, the wireless communication device 102 may clear 1014 the throttling counter associated with the current evolved high rate packet data (eHRPD) network access system 112. The wireless communication device 102 may then maintain 1006 the evolved high rate packet data (eHRPD) only silent redial (EHSR) state.

Figure 11:
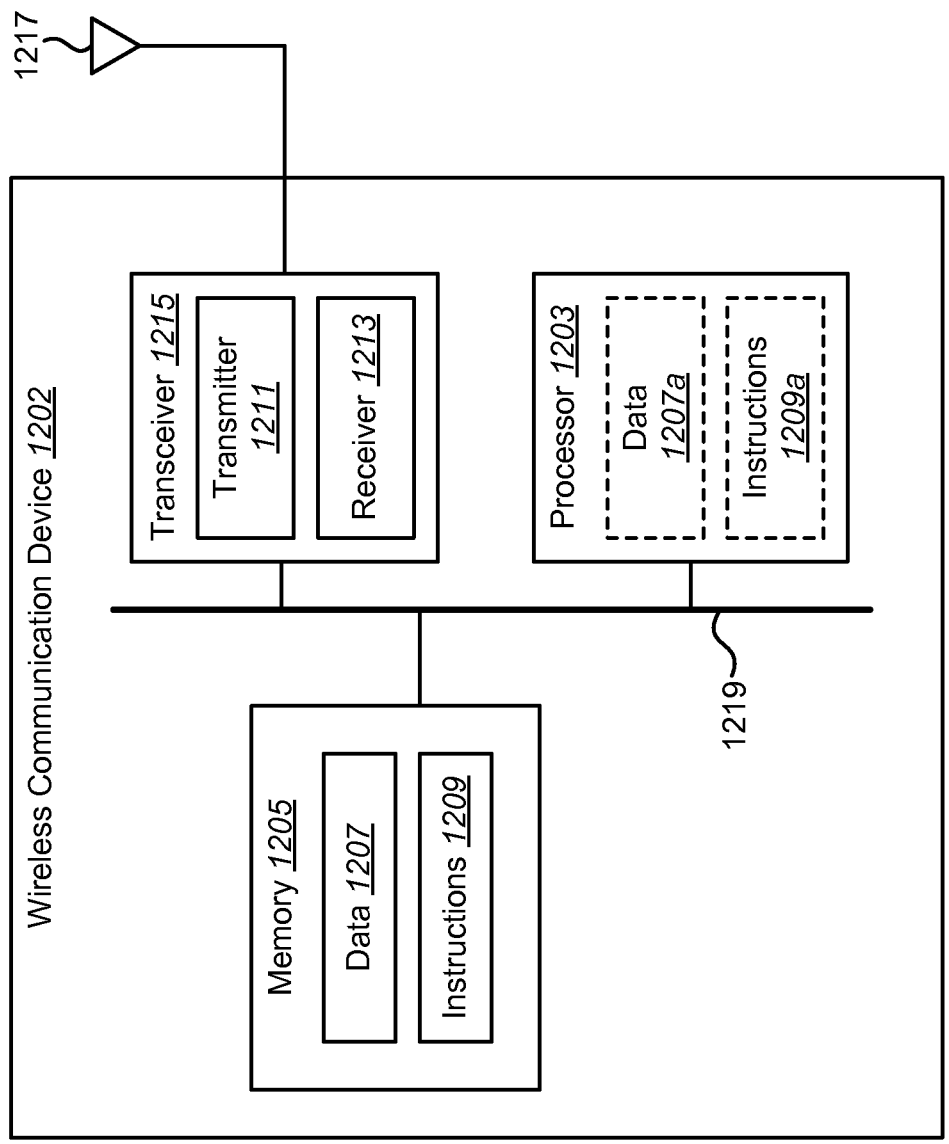
FIG. 11 is a block diagram illustrating certain components that may be included within a wireless communication device that is configured in accordance with the present disclosure.

FIG. 11 illustrates certain components that may be included within a wireless communication device 1202. The wireless communication device 1202 may be an access terminal, a mobile station, a user equipment (UE), etc. The wireless communication device 1202 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1202 of FIG. 11, in an alternative configuration, a combination of processors (e.g., an ARM and DSP) could be used.

The wireless communication device 1202 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209*a* may be loaded onto the processor 1203, and various pieces of data 1207*a* may be loaded onto the processor 1203.

The wireless communication device 1202 may also include a transmitter 1211 and a receiver 1213 to allow transmission and reception of signals to and from the wireless communication device 1202 via an antenna 1217. The transmitter 1211 and receiver 1213 may be collectively referred to as a transceiver 1215. The wireless communication device 1202 may also include (not shown) multiple transmitters, multiple antennas, multiple receivers and/or multiple transceivers.

The various components of the wireless communication device 1202 may be coupled together by one or more buses, which may include a power bus, a control signal bus, a status signal bus, a data bus, etc. For the sake of clarity, the various buses are illustrated in FIG. 11 as a bus system 1219.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 5, 6 and 9-10, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for optimizing data retry mechanisms performed by a wireless communication device, the method comprising:
   attempting to originate a data call on an evolved high rate packet data system;
   determining that originating the data call has failed;
   determining a type of failure that caused the data call to fail; and
   reducing the frequency of data call origination attempts based on the type of failure,
   wherein the wireless communication device has an established data session with a 1x/high rate packet data system for a first application, and further comprising:
   receiving a request for a data call from a second application, wherein the second application supports evolved high rate packet data only mode;
   placing the data call over the 1x/high rate packet data system, wherein the data call is torn down once connected; and
   attempting the data call over an evolved high rate packet data system if the established data session ends, a point-to-point protocol session is brought down and a throttling timer associated with the evolved high rate packet data system has expired.

2. The method of claim 1, wherein the method is performed by an advanced mobile subscriber software on the wireless communication device.

3. The method of claim 1, further comprising receiving a request for the data call from an application on the wireless communication device.

4. The method of claim 3, wherein the type of failure is a radio layer system failure, and further comprising:
   avoiding the evolved high rate packet data system for a radio layer system failure time period;
   performing silent redial for a silent redial period;
   determining that the silent redial period has not ended; and
   attempting the data call on another available system that is not throttled using silent redial procedures.

5. The method of claim 3, wherein the type of failure is a point-to-point protocol failure, and further comprising:
   notifying the application of the failure;
   throttling the evolved high rate packet data system using data session throttling with a soft throttling timer; and
   discontinuing throttling the evolved high rate packet data system when the soft throttling timer expires.

6. The method of claim 5, wherein a soft throttling time used by the soft throttling timer is dependent on a soft failure count.

7. The method of claim 3, wherein the type of failure is an Extensible Authentication Protocol Method for Universal Mobile Telecommunications System Authentication and Key Agreement failure, and further comprising:
   notifying the application of the failure;
   throttling the evolved high rate packet data system using data session throttling with a hard throttling timer; and
   discontinuing throttling the evolved high rate packet data system when the hard throttling timer expired.

8. The method of claim 3, wherein the type of failure is a Vendor-Specific Network Control Protocol negotiation failure, and further comprising:
   notifying the application of the failure; and
   performing packet data network level throttling.

9. The method of claim 3, wherein the request for a data call is on a system that is currently throttled by data session throttling, wherein the wireless communication device is in hybrid mode in an auto silent redial state with 1x service, and further comprising attempting the data call on a 1x system.

10. The method of claim 3, wherein the request for a data call is on a system that is currently throttled by data session throttling, wherein the wireless communication device is in an auto silent redial state with 1x service and not in a hybrid mode, and further comprising returning an error to the application.

11. A wireless device configured for optimizing data retry mechanisms, comprising:
    a processor;
    memory in electronic communication with the processor;
    instructions stored in the memory, the instructions being executable by the processor to:
       attempt to originate a data call on an evolved high rate packet data system;
       determine that originating the data call has failed;
       determine a type of failure that caused the data call to fail; and
       reduce the frequency of data call origination attempts based on the type of failure,
    wherein the instructions are further executable to receive a request for the data call from an application on the wireless device, and
    wherein the wireless device has an established data session with a 1x/high rate packet data system for a first application, and wherein the instructions are further executable to:
    receive a request for a data call from a second application, wherein the second application supports evolved high rate packet data only mode;
    place the data call over the 1x/high rate packet data system, wherein the data call is torn down once connected; and attempt the data call over an evolved high rate packet data system if the established data session ends, a point-to-point protocol session is brought down and a throttling timer associated with the evolved high rate packet data system has expired.

12. The wireless device of claim 11, wherein the wireless device further comprises an advanced mobile subscriber software.

13. The wireless device of claim 11, wherein the type of failure is a radio layer system failure, and wherein the instructions are further executable to:
avoid the evolved high rate packet data system for a radio layer system failure time period;
perform silent redial for a silent redial period;
determine that the silent redial period has not ended; and
attempt the data call on another available system that is not throttled using silent redial procedures.

14. The wireless device of claim 11, wherein the type of failure is a point-to-point protocol failure, and wherein the instructions are further executable to:
notify the application of the failure;
throttle the evolved high rate packet data system using data session throttling with a soft throttling timer; and
discontinue throttling the evolved high rate packet data system when the soft throttling timer expires.

15. The wireless device of claim 14, wherein a soft throttling time used by the soft throttling timer is dependent on a soft failure count.

16. The wireless device of claim 11, wherein the type of failure is an Extensible Authentication Protocol Method for Universal Mobile Telecommunications System Authentication and Key Agreement failure, and wherein the instructions are further executable to:
notify the application of the failure;
throttle the evolved high rate packet data system using data session throttling with a hard throttling timer; and
discontinue throttling the evolved high rate packet data system when the hard throttling timer expired.

17. The wireless device of claim 11, wherein the type of failure is a Vendor-Specific Network Control Protocol negotiation failure, and wherein the instructions are further executable to:
notify the application of the failure; and
perform packet data network level throttling.

18. The wireless device of claim 11, wherein the request for a data call is on a system that is currently throttled by data session throttling, wherein the wireless device is in hybrid mode in an auto silent redial state with 1x service, and wherein the instructions are further executable to attempt the data call on a 1x system.

19. The wireless device of claim 11, wherein the request for a data call is on a system that is currently throttled by data session throttling, wherein the wireless device is in an auto silent redial state with 1x service and not in hybrid mode, and wherein the instructions are further executable to return an error to the application.

20. A method for optimizing data retry mechanisms, comprising:
tracking whether a wireless communication device is operating in an evolved high rate packet data only silent redial state or in an auto silent redial state; and
determining whether to implement throttling on systems on which to attempt a data call origination based on the tracked state,
wherein the wireless communication device is operating in the evolved high rate packet data only silent redial state, and further comprising:
attempting a packet data call over an evolved high rate packet data system;
determining that the packet data call attempt has succeeded;
clearing a throttling counter associated with the evolved high rate packet data system; and
maintaining the evolved high rate packet data only silent redial state.

21. The method of claim 20, wherein the method is performed by the wireless communication device.

22. A method for optimizing data retry mechanisms, comprising:
tracking whether a wireless communication device is operating in an evolved high rate packet data only silent redial state or in an auto silent redial state;
determining whether to implement throttling on systems on which to attempt a data call origination based on the tracked state,
attempting a packet data call over a data optimized system;
determining that the packet data call attempt has failed; and
performing silent redial over the same data optimized system or one or more preferred data optimized systems in a preferred roaming list for a silent redial period,
wherein performing silent redial comprises:
incrementing a current failure count and a total failure count each time a call attempt fails;
starting a new attempts timer when the packet data call attempt fails;
resetting the new attempts timer if a new call attempt occurs before the new attempts timer has expired; and
resetting the current failure count if the new attempts timer expires.

23. The method of claim 22, further comprising switching to operating in the auto silent redial state if the current failure count equals a current failure threshold or the total failure count equals a total failure threshold during the silent redial period.

24. The method of claim 22, further comprising maintaining the evolved high rate packet data only silent redial state if the current failure count is less than a current failure threshold and the total failure count is less than a total failure threshold during the silent redial period.

25. The method of claim 22, wherein the wireless communication device is operating in the auto silent redial state, wherein the packet data call has succeeded during the silent redial period, wherein the packet data call was made on an evolved high rate packet data system, and further comprising:
clearing a data session throttling counter associated with a current evolved high rate packet data system;
switching to an evolved high rate packet data only silent redial state;
resetting the current failure count; and
resetting the total failure count.

26. The method of claim 22, wherein the wireless communication device is operating in the auto silent redial state, wherein the packet data call has not succeeded during the silent redial period, and further comprising maintaining the auto silent redial state.

27. The method of claim 22, wherein the wireless communication device is operating in the auto silent redial state, wherein the packet data call has succeeded during the silent redial period, wherein the packet data call was not made on an evolved high rate packet data system, and further comprising maintaining the auto silent redial state.

28. A method for optimizing data retry mechanisms, comprising:

tracking whether a wireless communication device is operating in an evolved high rate packet data only silent redial state or in an auto silent redial state; and determining whether to implement throttling on systems on which to attempt a data call origination based on the tracked state, wherein the wireless communication device is operating in the evolved high rate packet data only silent redial state, and further comprising:

attempting a packet data call over an evolved high rate packet data system;

determining that the packet data call attempt has failed;

performing silent redial over the same data optimized system or one or more preferred data optimized systems;

determining that the packet data call has not succeeded during a silent redial period;

incrementing a current failure count and a total failure count; and switching to operating in the auto silent redial state if either the current failure count is not less than a current failure threshold or the total failure count is not less than a total failure threshold.

29. A method for optimizing data retry mechanisms, comprising:

tracking whether a wireless communication device is operating in an evolved high rate packet data only silent redial state or in an auto silent redial state; and determining whether to implement throttling on systems on which to attempt a data call origination based on the tracked state, wherein the wireless communication device is operating in the evolved high rate packet data only silent redial state, and further comprising:

attempting a packet data call over an evolved high rate packet data system;

determining that the packet data call attempt has failed;

performing silent redial over the same data optimized system or one or more preferred data optimized systems;

determining that the packet data call has not succeeded during a silent redial period;

incrementing a current failure count and a total failure count; and maintaining the evolved high rate packet data only silent redial state if both the current failure count is less than a current failure threshold and the total failure count is less than a total failure threshold.

30. A wireless device configured for optimizing data retry mechanisms, comprising:

a processor;

memory in electronic communication with the processor;

instructions stored in the memory, the instructions being executable by the processor to:

track whether the wireless device is operating in an evolved high rate packet data only silent redial state or in an auto silent redial state; and determine whether to implement throttling on systems on which to attempt a data call origination based on the tracked state, wherein the wireless device is operating in the evolved high rate packet data only silent redial state, and wherein the instructions are further executable to:

attempt a packet data call over an evolved high rate packet data system;

determine that the packet data call attempt has succeeded;

clear a throttling counter associated with the evolved high rate packet data system; and maintain the evolved high rate packet data only silent redial state.

31. A wireless device configured for optimizing data retry mechanisms, comprising:

a processor;

memory in electronic communication with the processor;

instructions stored in the memory, the instructions being executable by the processor to:

track whether the wireless device is operating in an evolved high rate packet data only silent redial state or in an auto silent redial state;

determine whether to implement throttling on systems on which to attempt a data call origination based on the tracked state;

attempt a packet data call over a data optimized system;

determine that the packet data call attempt has failed; and perform silent redial over the same data optimized system or one or more preferred data optimized systems in a preferred roaming list for a silent redial period, wherein performing silent redial comprises:

incrementing a current failure count and a total failure count each time a call attempt fails;

starting a new attempts timer when the packet data call attempt fails;

resetting the new attempts timer if a new call attempt occurs before the new attempts timer has expired; and resetting the current failure count if the new attempts timer expires.

32. The wireless device of claim 31, wherein the instructions are further executable to switch to operating in the auto silent redial state if the current failure count equals a current failure threshold or the total failure count equals a total failure threshold during the silent redial period.

33. The wireless device of claim 32, wherein the instructions are further executable to maintain the evolved high rate packet data only silent redial state if the current failure count is less than the current failure threshold and the total failure count is less than the total failure threshold during the silent redial period.

34. The wireless device of claim 32, wherein the wireless device is operating in the evolved high rate packet data only silent redial state, and wherein the instructions are further executable to:

attempt the packet data call over an evolved high rate packet data system;

determine that the packet data call attempt has failed;

perform silent redial over the same data optimized system or one or more preferred data optimized systems;

determine that the packet data call has not succeeded during the silent redial period;

increment the current failure count and the total failure count; and switch to operating in the auto silent redial state if either the current failure count is not less than the current failure threshold or the total failure count is not less than the total failure threshold.

35. The wireless device of claim 31, wherein the wireless is operating in the auto silent redial state, wherein the packet data call has succeeded during the silent redial period, wherein the packet data call was made on the evolved high rate packet data system, and wherein the instructions are further executable to:

clear a data session throttling counter associated with a current evolved high rate packet data system;

switch to an evolved high rate packet data only silent redial state;

reset the current failure count; and
reset the total failure count.

36. The wireless device of claim 31, wherein the wireless device is operating in the auto silent redial state, wherein the packet data call has not succeeded during the silent redial period, and wherein the instructions are further executable to maintain the auto silent redial state.

37. The wireless device of claim 31, wherein the wireless device is operating in the auto silent redial state, wherein the packet data call has succeeded during the silent redial period, wherein the packet data call was not made on an evolved high rate packet data system, and further comprising maintaining the auto silent redial state.

38. A wireless device configured for optimizing data retry mechanisms, comprising:
    a processor;
    memory in electronic communication with the processor;
    instructions stored in the memory, the instructions being executable by the processor to:
        track whether the wireless device is operating in an evolved high rate packet data only silent redial state or in an auto silent redial state; and
        determine whether to implement throttling on systems on which to attempt a data call origination based on the tracked state,
    wherein the wireless device is operating in the evolved high rate packet data only silent redial
        state, and wherein the instructions are further executable to:
    attempt a packet data call over the evolved high rate packet data system;
    determine that the packet data call attempt has failed;
    perform silent redial over the same data optimized system or one or more preferred data optimized systems;
    determine that the packet data call has not succeeded during a silent redial period;
    increment a current failure count and a total failure count; and
    maintain the evolved high rate packet data only silent redial state if both the current failure count is less than a current failure threshold and the total failure count is less than a total failure threshold.

39. An apparatus for optimizing data retry mechanisms, comprising:
    means for attempting to originate a data call on an evolved high rate packet data system;
    means for determining that originating the data call has failed;
    means for determining a type of failure that caused the data call to fail; and
    means for reducing the frequency of data call origination attempts based on the type of failure;
    wherein the wireless communication device has an established data session with a 1x/high rate packet data system for a first application, and further comprising:
    means for receiving a request for a data call from a second application, wherein the second application supports evolved high rate packet data only mode;
    means for placing the data call over the 1x/high rate packet data system, wherein the data call is torn down once connected; and
    means for attempting the data call over an evolved high rate packet data system if the established data session ends, a point-to-point protocol session is brought down and a throttling timer associated with the evolved high rate packet data system has expired.

40. A computer-program product for a wireless device configured for optimizing data retry mechanisms, the computer-program product comprising a non-transitory computer-readable medium having instructions thereon, the instructions comprising:
    code for causing the wireless device to attempt to originate a data call on an evolved high rate packet data system;
    code for causing the wireless device to determine that originating the data call has failed;
    code for causing the wireless device to determine a type of failure that caused the data call to fail; and
    code for causing the wireless device to reduce the frequency of data call origination attempts based on the type of failure,
    wherein the wireless communication device has an established data session with a 1x/high rate packet data system for a first application, and further comprising:
    code for receiving a request for a data call from a second application, wherein the second application supports evolved high rate packet data only mode;
    code for placing the data call over the 1x/high rate packet data system, wherein the data call is torn down once connected; and
    code for attempting the data call over an evolved high rate packet data system if the established data session ends, a point-to-point protocol session is brought down and a throttling timer associated with the evolved high rate packet data system has expired.

41. An apparatus for optimizing data retry mechanisms, comprising:
    means for tracking whether a wireless communication device is operating in an evolved high rate packet data only silent redial state or in an auto silent redial state; and
    means for determining whether to implement throttling on systems on which to attempt a data call origination based on the tracked state,
    wherein the wireless communication device is operating in the evolved high rate packet data only silent redial state, and further comprising:
    means for attempting a packet data call over an evolved high rate packet data system;
    means for determining that the packet data call attempt has succeeded;
    means for clearing a throttling counter associated with the evolved high rate packet data system; and
    means for maintaining the evolved high rate packet data only silent redial state.

42. A computer-program product for a wireless device configured for optimizing data retry mechanisms, the computer-program product comprising a non-transitory computer-readable medium having instructions thereon, the instructions comprising:
    code for causing the wireless device to track whether a wireless communication device is operating in an evolved high rate packet data only silent redial state or in an auto silent redial state; and
    code for causing the wireless device to determine whether to implement throttling on systems on which to attempt a data call origination based on the tracked state,
    wherein the wireless communication device is operating in the evolved high rate packet data only silent redial state, and further comprising:
    code for attempting a packet data call over an evolved high rate packet data system;
    code for determining that the packet data call attempt has succeeded;

code for clearing a throttling counter associated with the evolved high rate packet data system; and code for maintaining the evolved high rate packet data only silent redial state.

\* \* \* \* \*